United States Patent
Tsai et al.

(10) Patent No.: US 9,166,254 B2
(45) Date of Patent: Oct. 20, 2015

(54) GEL POLYMER ELECTROLYTE AND LITHIUM POLYMER BATTERY

(71) Applicant: Industrial Technology Research Institute, Hsinchu (TW)

(72) Inventors: Li-Duan Tsai, Hsinchu (TW); Chih-Ching Chang, Hsinchu (TW); Chia-Chen Fang, Taipei (TW); Wei-Hsin Wu, Kaohsiung (TW); Chun-Lung Li, Taoyuan County (TW); Yueh-Wei Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 240 days.

(21) Appl. No.: 13/887,371

(22) Filed: May 6, 2013

(65) Prior Publication Data

US 2014/0186718 A1    Jul. 3, 2014

(30) Foreign Application Priority Data

Dec. 28, 2012   (TW) .............................. 101150809 A

(51) Int. Cl.
*H01M 6/14* (2006.01)
*H01M 10/0565* (2010.01)
(Continued)

(52) U.S. Cl.
CPC ........... *H01M 10/0565* (2013.01); *C08L 71/00* (2013.01); *H01M 4/13* (2013.01); *H01M 10/0525* (2013.01); *H01M 4/366* (2013.01); *Y02E 60/122* (2013.01)

(58) Field of Classification Search
CPC ............. C08G 73/1057; C08G 73/124; C08G 73/127; H01M 10/0565; H01M 4/13; H01M 4/366; H01M 10/0525; Y02E 60/122
USPC ......................................................... 429/303
See application file for complete search history.

(56) References Cited

U.S. PATENT DOCUMENTS 6,677,084 B1   1/2004   Matsui et al.
6,706,823 B2   3/2004   Wang et al.
(Continued)

FOREIGN PATENT DOCUMENTS

CN    101212065    7/2008
CN    101471456    7/2009
(Continued)

OTHER PUBLICATIONS

"Office Action of Taiwan Counterpart Application", issued on Jul. 14, 2014, p. 1-p. 4.
(Continued)

*Primary Examiner* — Shane Fang
(74) *Attorney, Agent, or Firm* — Jianq Chyun IP Office

(57) ABSTRACT

The application relates to a gel polymer electrolyte and/or polymer modified electrode materials for lithium batteries. The gel polymer electrolyte or the polymer modified electrode material includes at least a polymer represented by the following formula (I):

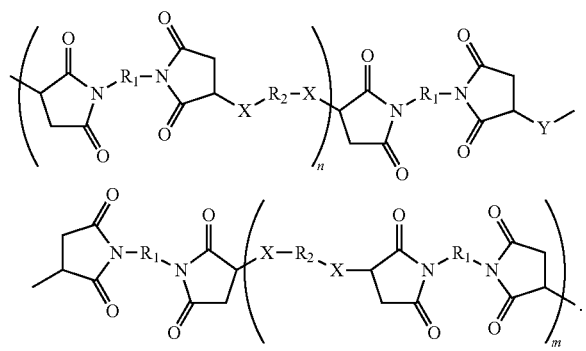

33 Claims, 4 Drawing Sheets

(51) Int. Cl.
  *H01M 10/0525* (2010.01)
  *C08L 71/00* (2006.01)
  *H01M 4/13* (2010.01)
  *H01M 4/36* (2006.01)

(56) References Cited

U.S. PATENT DOCUMENTS

| 7,560,194 | B2 | 7/2009 | Lin et al. | |
|---|---|---|---|---|
| 8,124,282 | B2 | 2/2012 | Pan et al. | |
| 2008/0160418 | A1* | 7/2008 | Pan et al. | 429/328 |
| 2008/0176141 | A1 | 7/2008 | Pan et al. | |
| 2012/0171576 | A1 | 7/2012 | Tsai et al. | |
| 2012/0171579 | A1 | 7/2012 | Tsai et al. | |

FOREIGN PATENT DOCUMENTS

| CN | 101475663 | 7/2009 |
|---|---|---|
| CN | 101685875 | 3/2010 |
| CN | 101702432 | 5/2010 |
| CN | 101931086 | 12/2010 |
| CN | 102421849 | 4/2012 |
| CN | 102569886 | 7/2012 |
| JP | 03266364 | 11/1991 |
| JP | 04060465 | 2/1992 |
| JP | 11045724 | 2/1999 |
| JP | 11219723 | 8/1999 |
| JP | 2000306605 | 11/2000 |
| JP | 2011174019 | 9/2011 |
| TW | I251361 | 3/2006 |
| TW | 200828651 | 7/2008 |
| TW | I309659 | 5/2009 |
| TW | 200926479 | 6/2009 |
| TW | 201001781 | 1/2010 |
| TW | 201136953 | 11/2011 |
| WO | 0235636 | 5/2002 |

OTHER PUBLICATIONS

Guangchao Li, et al, "Research on a gel polymer electrolyte for Li-ion batteries", Pure and Applied Chemistry, vol. 80, 2008, No. 11, pp. 2553-2563.

Fu-Ming Wang, et al., "Novel SEI formation of maleimide-based additives and its improvement of capability and cyclicability in lithium ion batteries", Electrochimica Acta, vol. 54, Apr. 30, 2009, pp. 3344-3351.

Wu Xu, et al., "A.C. impedance study on the interface of lithium and polymer electrolyte based on lithium-N(4-sulfophenyl) maleimide", Solid State Ionics, vol. 112, Sep. 1998, pp. 1-8.

Fu-Ming Wang, et al., "Self-polymerized membrane derivative of branched additive for internal short protection of high safety lithium ion battery", Journal of Membrane Science, vol. 368, Feb. 15, 2011, pp. 165-170.

Kang Xu, "Nonaqueous Liquid Electrolytes for Lithium-Based Rechargeable Batteries", Chemical Reviews, vol. 104, No. 10, Oct. 2004, pp. 4303-4417.

"Office Action of China Counterpart Application", issued on Jul. 23, 2015, p. 1-p. 6, in which the listed references were cited.

* cited by examiner

GEL POLYMER ELECTROLYTE AND LITHIUM POLYMER BATTERY

CROSS-REFERENCE TO RELATED APPLICATION

This application claims the priority benefit of Taiwan application serial no. 101150809, filed on Dec. 28, 2012. The entirety of the above-mentioned patent application is hereby incorporated by reference herein and made a part of this specification.

BACKGROUND OF THE INVENTION

1. Technical Field

The disclosure relates to an electrolyte, and more particularly relates to a gel polymer electrolyte.

2. Background

Lithium-ion secondary batteries are the main stream commercial products and presently developed toward lighter weight, higher energy capacity, longer life span and better safety. However, the nonaqueous electrolyte solution used in the commercial batteries are prone to leakage and explosion and thus dangerous. Also, dendrite present on the negative electrode of the batteries may lead to shorts or even explosions. Further improvements are required to ensure the safety of the nonaqueous electrolyte solution for daily applications.

On the other hand, polymer gel electrolyte has been developed as a safer alternative for the nonaqueous electrolyte solution. However, due to the higher viscosity of the polymerized gel electrolyte, it is unlikely to use vacuum filling process to fill the electrolyte for battery fabrication, which becomes the fabrication bottleneck.

SUMMARY

The embodiment of the disclosure provides a gel polymer electrolyte, having a polymer impregnated with a nonaqueous electrolyte solution to form the gel polymer electrolyte, wherein the polymer is represented by the following general formula (I):

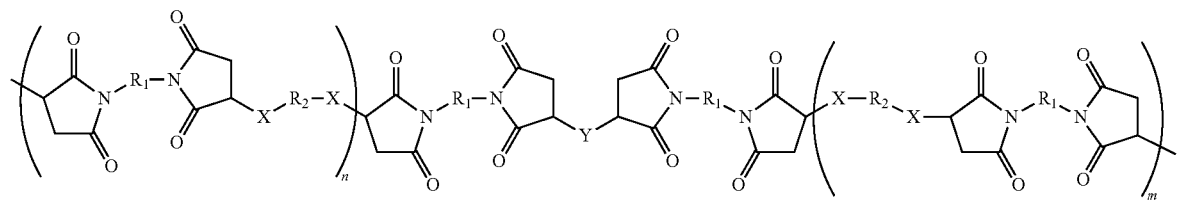

(I)

wherein n≥1, m≥1 and n+m=2~500; X is independently selected from NH, N, S, or P; Y is nitrogen-containing five-membered heterocyclic group or nitrogen-containing six-membered heterocyclic group; $R_1$ is independently selected from —$CH_2NHCH_2$—, —$C_2H_4NHC_2H_4$—, —$C(O)CH_2$—, —$CH_2OCH_2$—, —$C(O)$—, —O—, —O—O—, —S—, —S—S—, —$S(O)$—, —$CH_2S(O)CH_2$—, —$(O)S(O)$—, —$CH_2(C_6H_4)CH_2$—, —$CH_2(C_6H_4)O$—, —$(CH_2CH(CH_3)O)_a$— where a=1~70, —$(CH_2CH_2O)_b$— where b=1~100, —$O(C_6H_4)C(CF_3)_2(C_6H_4)O$—, substituted or non-substituted phenylene, substituted or non-substituted biphenylene, or —$(CH_2CH_2)_d$— where d=1~4, or any of the following groups:

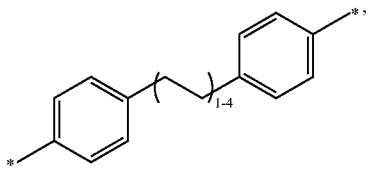

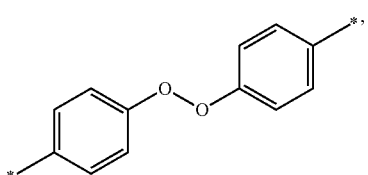

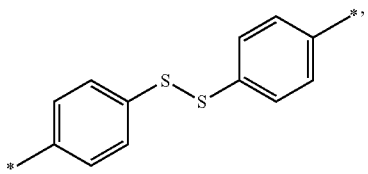

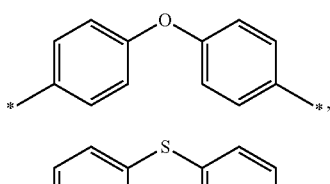

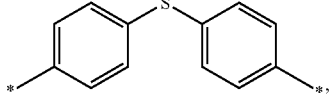

-continued

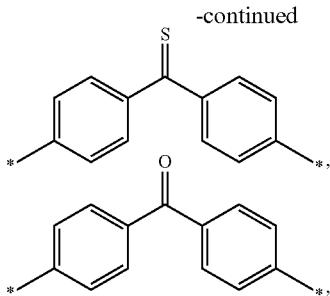

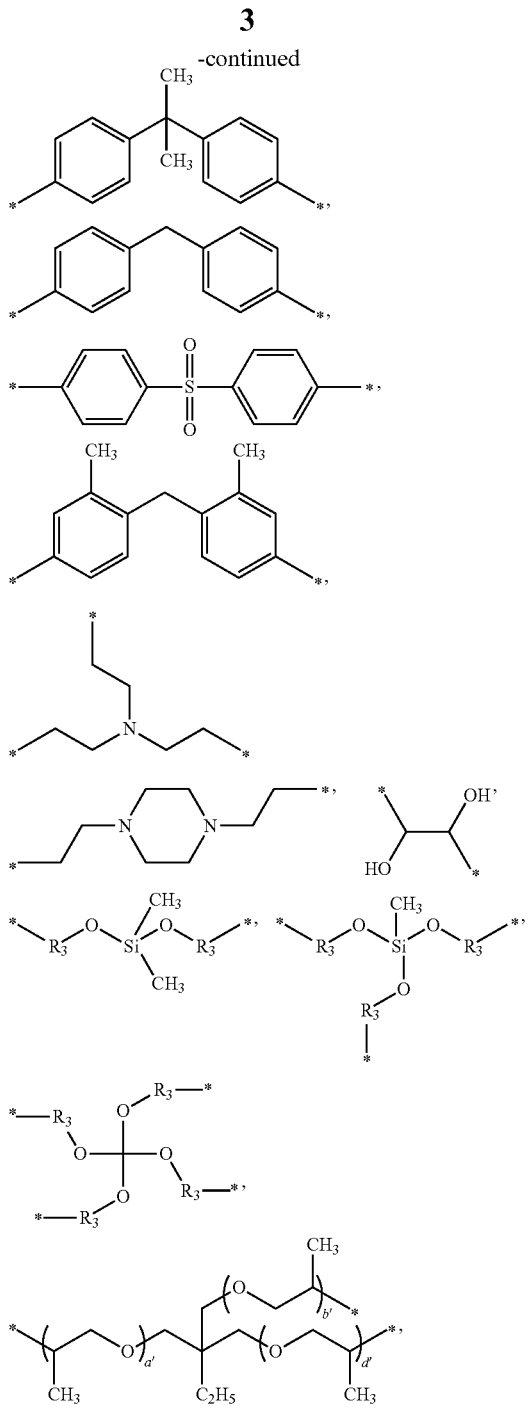

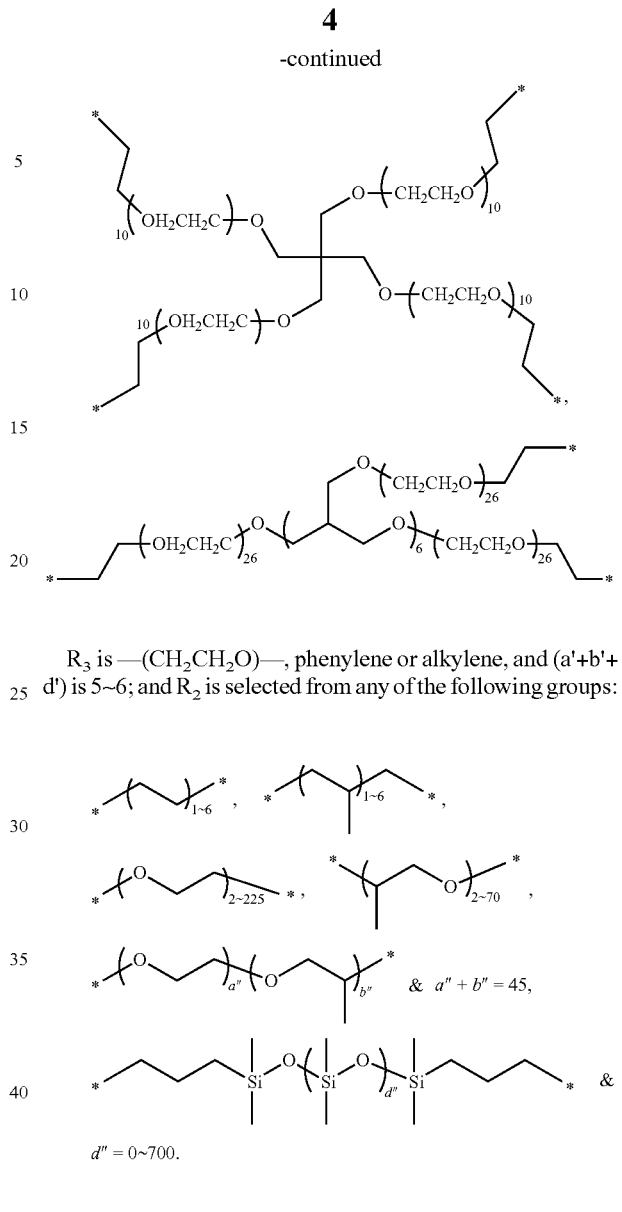

$R_3$ is —$(CH_2CH_2O)$—, phenylene or alkylene, and $(a'+b'+d')$ is 5~6; and $R_2$ is selected from any of the following groups:

The embodiment of the disclosure provides a polymer lithium-ion secondary battery including at least a gel polymer electrolyte, a positive electrode and a negative electrode. The gel polymer electrolyte is formed from a polymer impregnated within a nonaqueous electrolyte solution. The polymer can be represented by the following general formula (I):

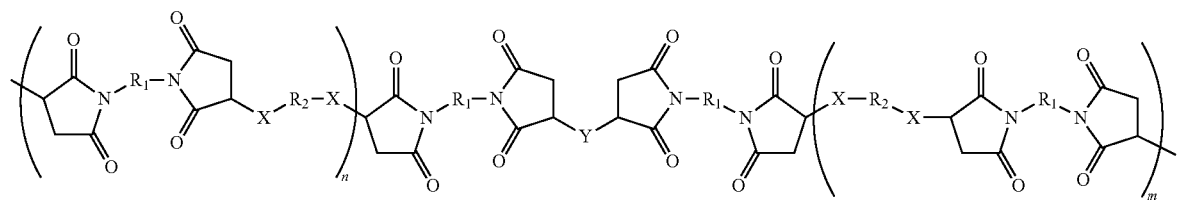

(I)

wherein n≥1, m≥1 and n+m=2~500; X is independently selected from NH, N, S, or P; Y is nitrogen-containing five-membered heterocyclic group or nitrogen-containing six-membered heterocyclic group; $R_1$ is independently selected from —$CH_2NHCH_2$—, —$C_2H_4NHC_2H_4$—, —$C(O)CH_2$—, —$CH_2OCH_2$—, —C(O)—, —O—, —O—O—, —S—, —S—S—, —S(O)—, —$CH_2S(O)CH_2$—, —(O)S(O)—, —$CH_2(C_6H_4)CH_2$—, —$CH_2(C_6H_4)O$—, —($CH_2CH(CH_3)O$)$_a$— where a=1~70, —($CH_2CH_2O$)$_b$— where b=1~100, —O($C_6H_4$)C($CF_3$)$_2$($C_6H_4$)O—, substituted or non-substituted phenylene, substituted or non-substituted biphenylene, or —($CH_2CH_2$)$_d$— where d=1~4, or any of the following groups:

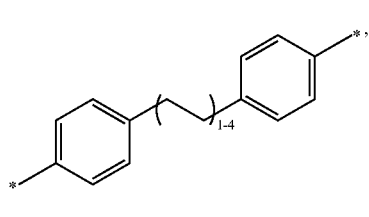

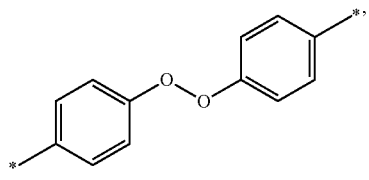

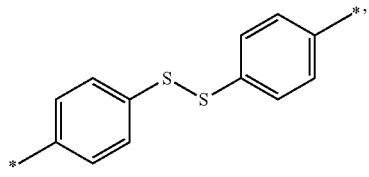

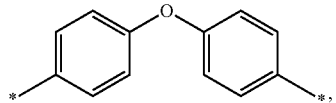

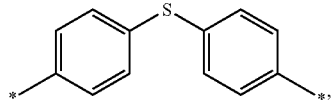

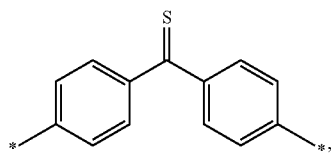

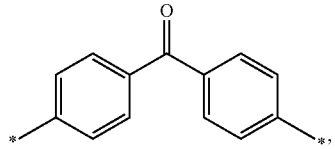

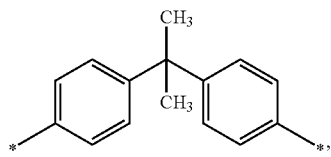

-continued

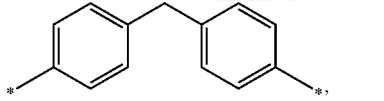

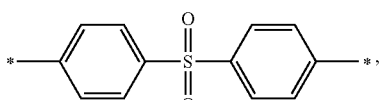

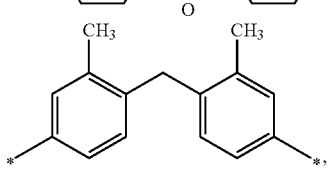

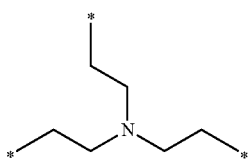

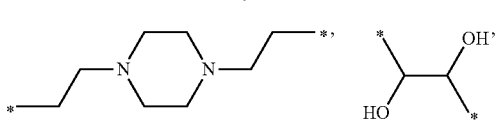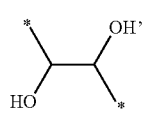

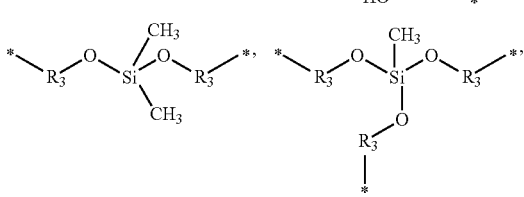

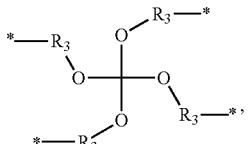

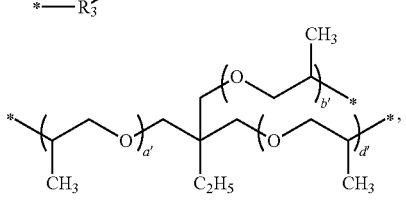

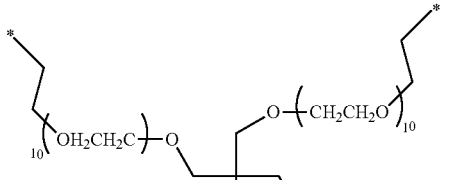

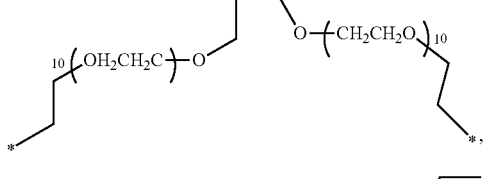

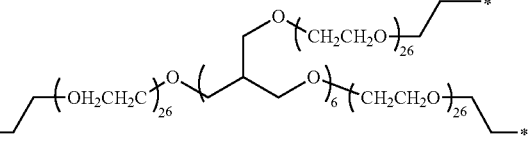

$R_3$ is —$(CH_2CH_2O)$—, phenylene or alkylene, and $(a'+b'+d')$ is 5~6; and $R_2$ is selected from any of the following groups:

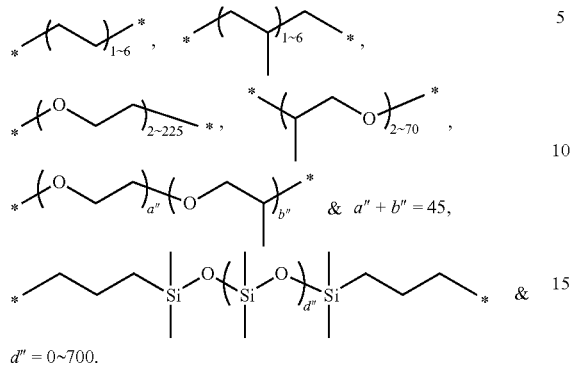

The embodiment of the disclosure provides a polymer lithium-ion secondary battery, including at least a gel polymer electrolyte, a positive electrode and a negative electrode. At least one of both materials of the positive electrode and negative electrode includes an electrode active material modified by a polymer layer thereon, the polymer modifies and covers a surface of the electrode active material in a ratio of 1~20 wt %. The polymer can be represented by the following general formula (I):

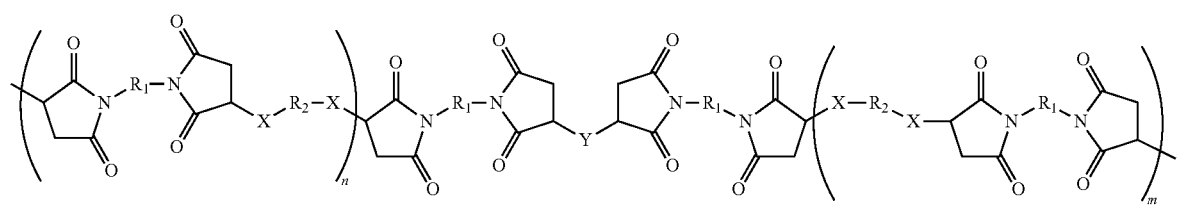

(I)

wherein $n \geq 1$, $m \geq 1$ and $n+m = 2$~500; X is independently selected from NH, N, S, or P; Y is nitrogen-containing five-membered heterocyclic group or nitrogen-containing six-membered heterocyclic group; $R_1$ is independently selected from —$CH_2NHCH_2$—, —$C_2H_4NHC_2H_4$—, —$C(O)CH_2$—, —$CH_2OCH_2$—, —$C(O)$—, —$O$—, —$O$—$O$—, —$S$—, —$S$—$S$—, —$S(O)$—, —$CH_2S(O)CH_2$—, —$(O)S(O)$—, —$CH_2(C_6H_4)CH_2$—, —$CH_2(C_6H_4)O$—, —$(CH_2CH(CH_3)O)_a$— where $a=1$~70, —$(CH_2CH_2O)_b$— where $b=1$~100, —$O(C_6H_4)C(CF_3)_2(C_6H_4)O$—, substituted or non-substituted phenylene, substituted or non-substituted biphenylene, or —$(CH_2CH_2)_d$— where $d=1$~4, or any of the following group:

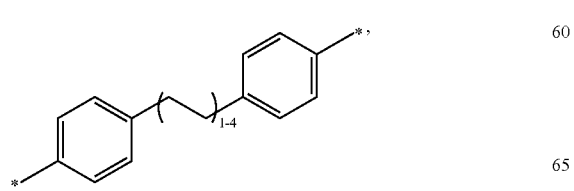

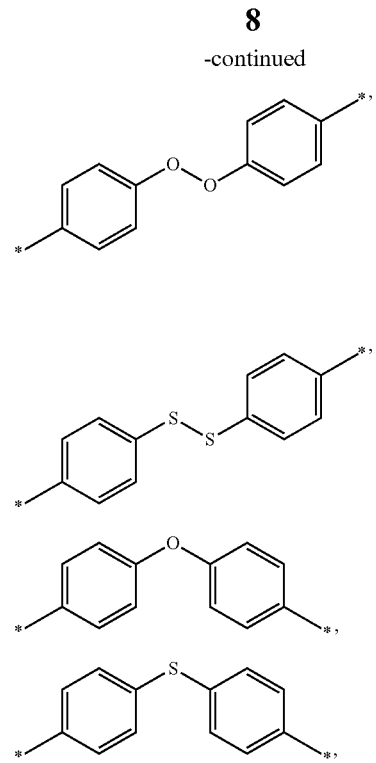

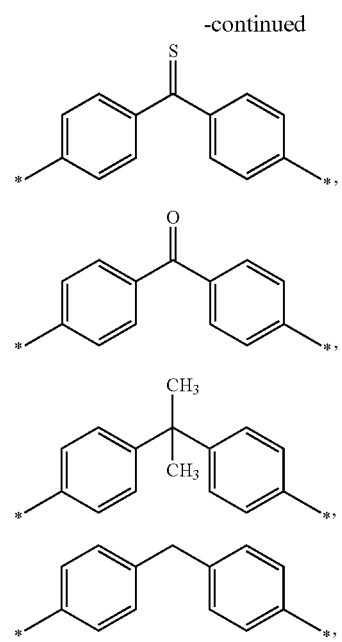

-continued

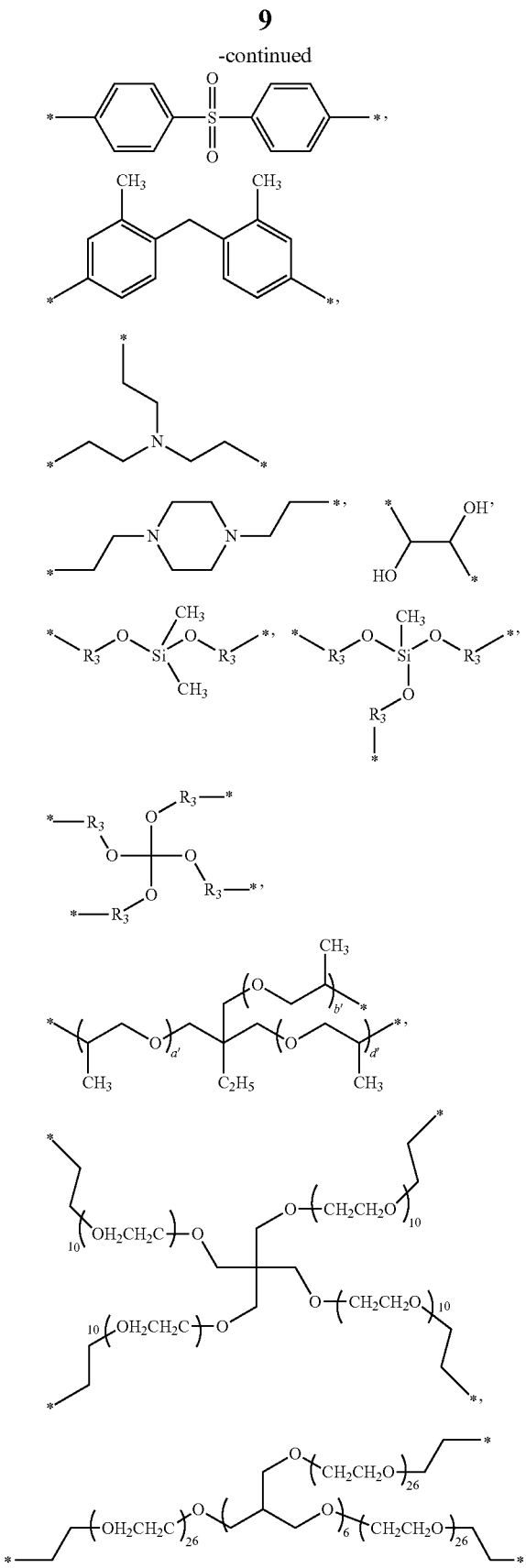

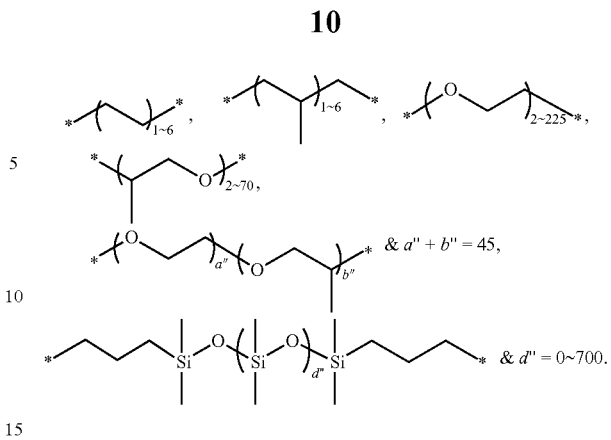

$R_3$ is —$(CH_2CH_2O)$—, phenylene or alkylene, and $(a'+b'+d')$ is 5~6; and $R_2$ is selected from any of the following groups:

A detailed description is given in the following embodiments with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
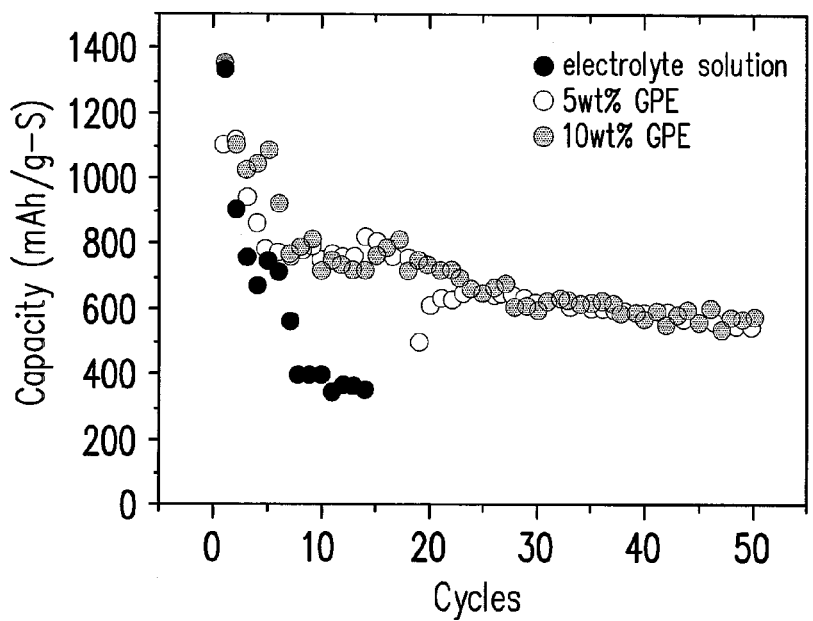
FIG. 1 illustrates the charging and discharging results of the coin cells fabricated with various kinds of polymerized gel electrolytes according to embodiments of the disclosure.

In the following detailed description, for purposes of explanation, numerous specific details are set forth in order to provide a thorough understanding of the disclosed embodiments.

In this embodiment, a prepolymer (a) is formed through an addition reaction of a maleimide-containing precursor A and a Lewis-base-containing precursor B in an electrolyte solution or a nonaqueous solvent. Then a suitable amount of a basic promoter C is added to promote a polymerization reaction and cross-linking to form a hyper-branched polymer P. When the hyper-branched polymer is formed within the electrolyte solution, the hyper-branched polymer is impregnated with the electrolyte solution to form a gel electrolyte. When the hyper-branched polymer is formed within the nonaqueous solvent, it can be used to modify the electrode active material of the electrode material.

The following scheme illustrates the exemplary synthesis mechanism of the hyper-branched polymer P of this disclosure. The synthesis scheme can be categorized as follows. Synthesis scheme (1) a prepolymer (a) is formed through an addition reaction of a maleimide-containing precursor A and a Lewis-base-containing precursor B in an electrolyte solution. After filling into the battery cavity, a suitable amount of a basic promoter C is added to promote a polymerization reaction and cross-linking in-situ to form a hyper-branched polymer P. Synthesis scheme (2) a prepolymer (a) is formed through an addition reaction of a maleimide-containing precursor A and a Lewis-base-containing precursor B in a non-aqueous solvent. Then a suitable amount of a basic promoter C is added to promote a polymerization reaction and cross-linking to form a hyper-branched polymer P. The above precursors will be described in details in the following contexts. In general, the molar ratios of the maleimide-containing precursor A: the Lewis-base-containing precursor B: the basic promoter C may be 1:0.1~10:0.01~1.

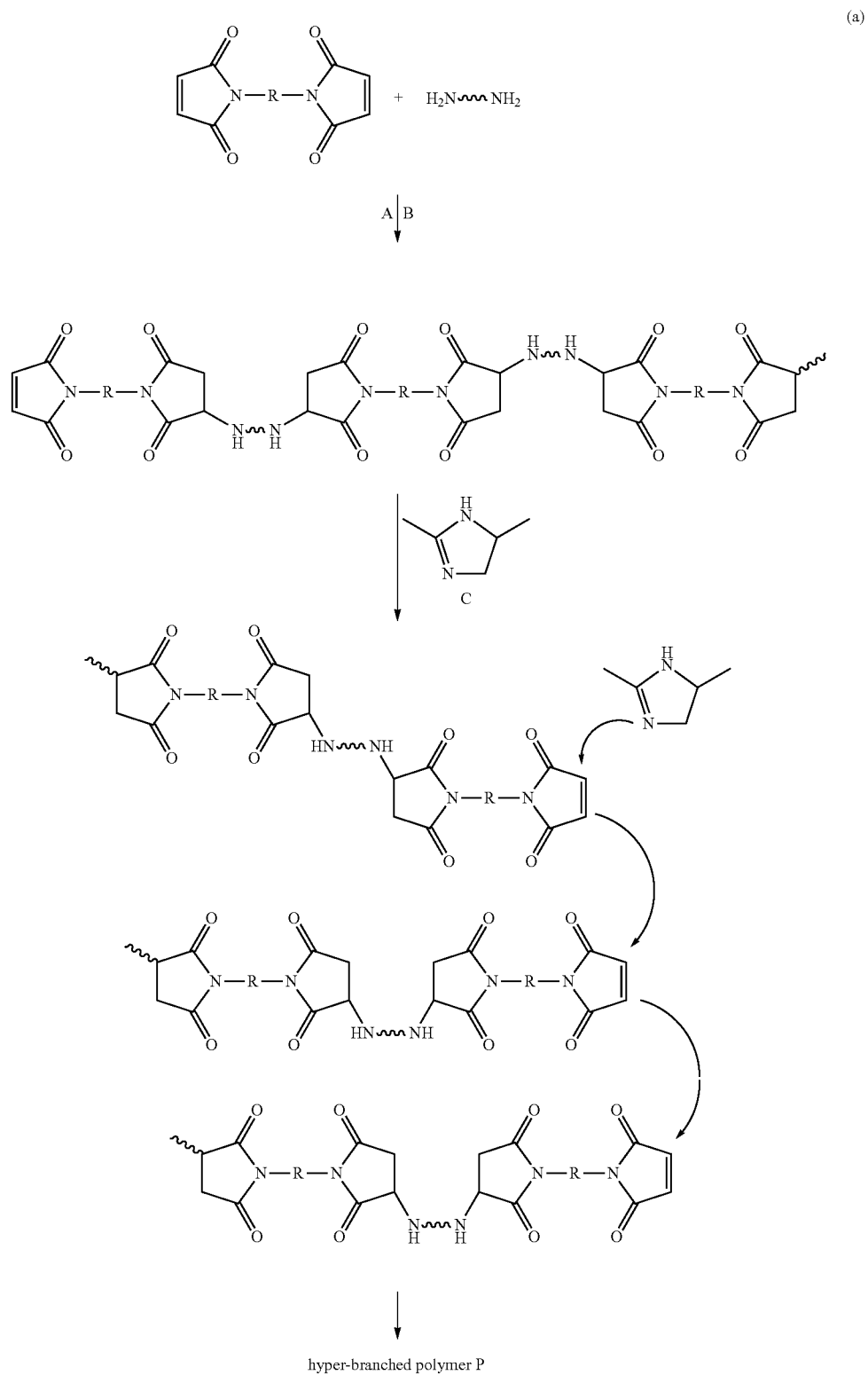

hyper-branched polymer P

The maleimide-containing precursor A may be any of the compounds represented by the following formulae (1)-(4).

formula (1)

(1)

R' is independently selected from —CH$_2$NHCH$_2$—, —C$_2$H$_4$NHC$_2$H$_4$—, —C(O)CH$_2$—, —CH$_2$OCH$_2$—, —C(O)—, —O—, —O—O—, —S—, —S—S—, —S(O)—, —CH$_2$S(O)CH$_2$—, —(O)S(O)—, —CH$_2$(C$_6$H$_4$)CH$_2$—, —CH$_2$(C$_6$H$_4$)O—, —(CH$_2$CH(CH$_3$)O)$_a$— where a=1~70, —(CH$_2$CH$_2$O)$_b$— where b=1~100, —O(C$_6$H$_4$)C(CF$_3$)$_2$(C$_6$H$_4$)O—, substituted or non-substituted phenylene, substituted or non-substituted biphenylene, or —(CH$_2$CH$_2$)$_d$—, where d=1~4, or any of the following functional groups:

formula (2)

(2)

R$_4$ is —(CH$_2$CH$_2$)n'—, —C(O)—, —C(CH$_3$)$_2$—, —O—, —O—O—, —S—, —S—S—, —S(O)—, —(O)S(O)—, or —O(C$_6$H$_4$)C(CF$_3$)$_2$(C$_6$H$_4$)O—, and n'=1~4.

formula (3)

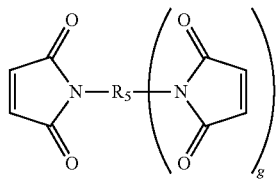

(3)

g=2, 3 or 7, and when g=2, R$_5$ is independently selected from the following functional groups:

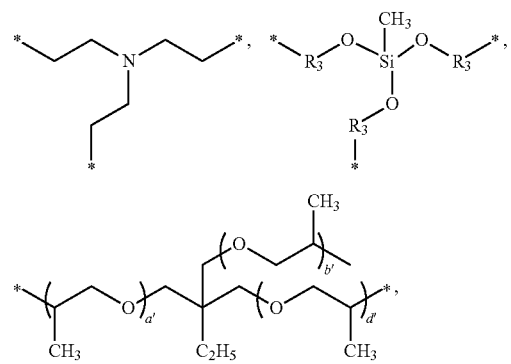

R$_3$ may be —(CH$_2$CH$_2$O)—, phenylene or alkylene, and (a'+b'+d') may be 5~6;

when g=3, R$_5$ is selected from any of the following functional groups:

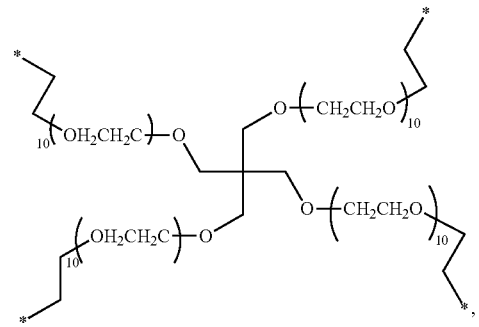

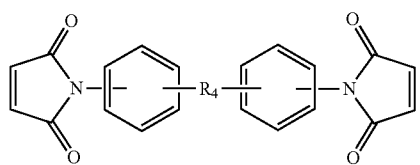

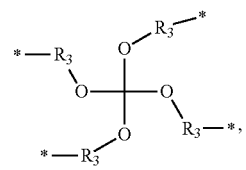

R$_3$ may be —(CH$_2$CH$_2$O)—, phenylene or alkylene;

when g=7, R$_5$ is represented by the following functional group:

R$_3$ may be —(CH$_2$CH$_2$O)—, phenylene or alkylene.

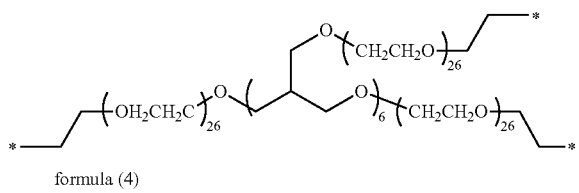

formula (4)

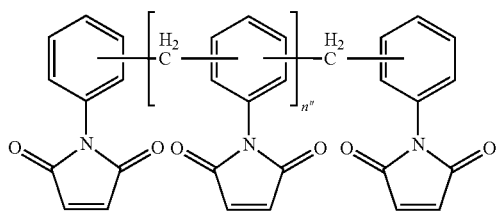

(4)

n''=2~5 (oligomers of phenylmethane maleimide, abbreviated as BMI2300).

The Lewis-base-containing precursor B may be any compound represented by the following formula (5), (5') or (5''):

formula (5), (5') & (5'')

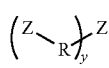 (5)

 (5')

 (5'')

$y=1\sim3$, $y'=1\sim3$, $y''=1\sim2$, $Z=NH_2$ or $SH$, and R is selected from any of the following functional groups:

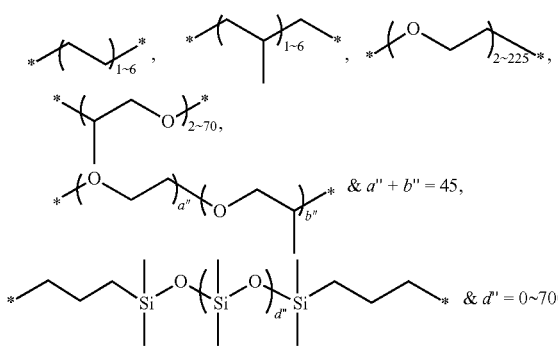

The basic promoter C may be any compound represented by the following formulae (6)-(13).

formula (6)

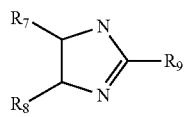 (6)

formula (7)

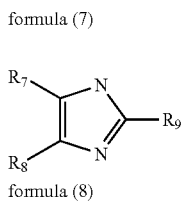 (7)

formula (8)

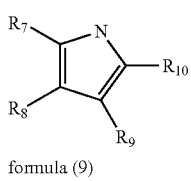 (8)

formula (9)

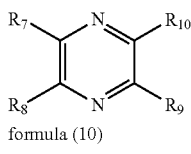 (9)

formula (10)

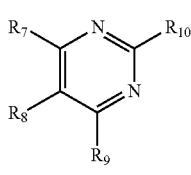 (10)

formula (11)

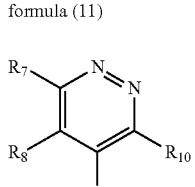 (11)

formula (12)

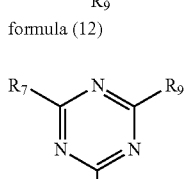 (12)

$R_7$, $R_8$, $R_9$, $R_{10}$ are individually selected from hydrogen, alkyl, alkylene, phenyl, dimethylamino, halogen or —$NH_2$.

formula (13)

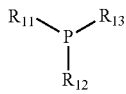 (13)

$R_{11}$, $R_{12}$, $R_{13}$ are individually selected from alkyl, alkylene, substituted or non-substituted phenyl or halogen. The basic promoter C may be an electron donor and the electrons are provided by the lone pair electrons of atom N, O, S, P of the basic promoter C, or provided by the π electrons of other functional groups, such as C—C double bond, C—C triple bond, C—O double bond, C—N double bond and C—N triple bond, of the basic promoter C.

The obtained hyper-branched polymer P may be represented by the following general formula (I):

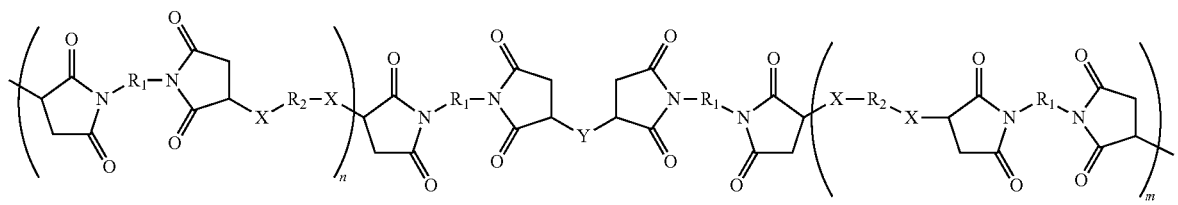

wherein n≥1, m≥1 and n+m=2~500; X is independently selected from NH, N, S, or P; Y is nitrogen-containing five-membered heterocyclic group or nitrogen-containing six-membered heterocyclic group; $R_1$ is independently selected from —CH$_2$NHCH$_2$—, —C$_2$H$_4$NHC$_2$H$_4$—, —C(O)CH$_2$—, —CH$_2$OCH$_2$—, —C(O)—, —O—, —O—O—, —S—, —S—S—, —S(O)—, —CH$_2$S(O)CH$_2$—, —(O)S(O)—, —CH$_2$(C$_6$H$_4$)CH$_2$—, —CH$_2$(C$_6$H$_4$)O—, —(CH$_2$CH(CH$_3$)O)$_a$— where a=1~70, —(CH$_2$CH$_2$O)$_b$— where b=1~100, —O(C$_6$H$_4$)C(CF$_3$)$_2$(C$_6$H$_4$)O—, substituted or non-substituted phenylene, substituted or non-substituted biphenylene, or —(CH$_2$CH$_2$)$_d$— where d=1~4, or any of the following groups:

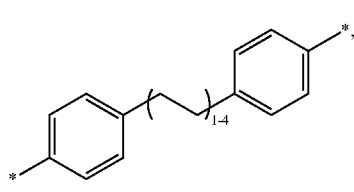

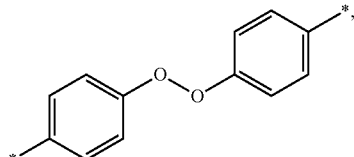

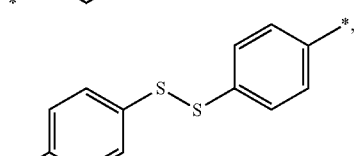

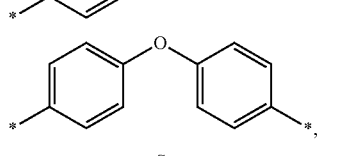

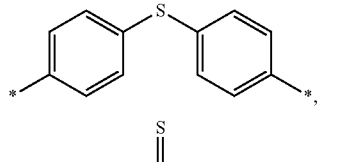

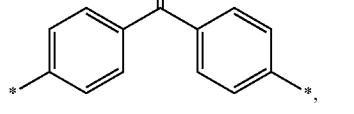

-continued

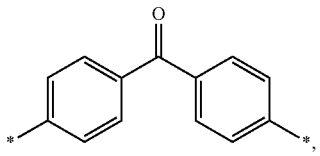

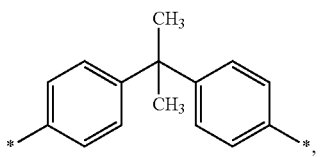

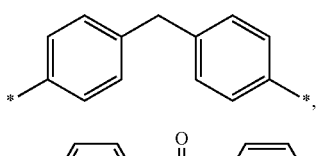

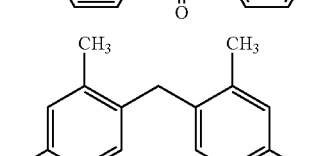

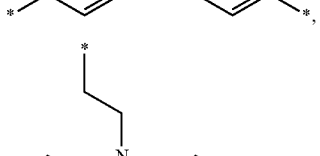

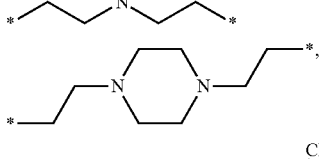

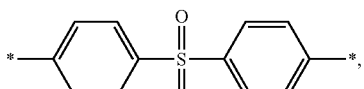

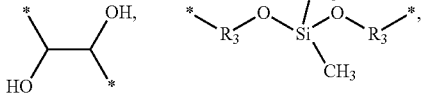

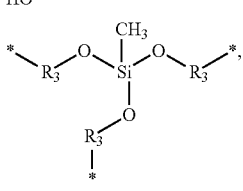

-continued

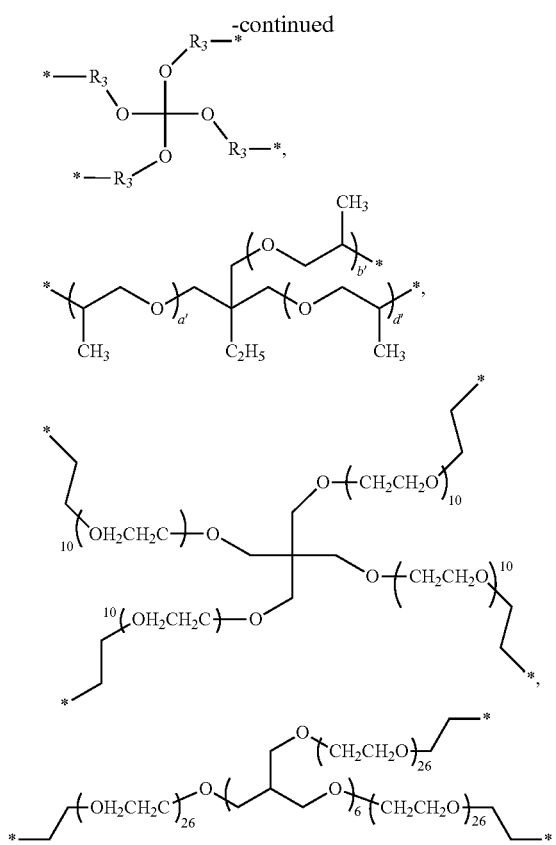

$R_3$ is —$(CH_2CH_2O)$—, phenylene or alkylene, and ($a'+b'+d'$) is 5~6; and $R_2$ is selected from any of the following groups:

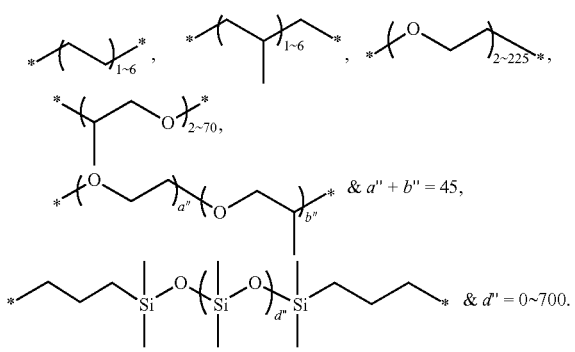

According to the reaction mechanism of the disclosure, a prepolymer (a) is formed through an addition reaction of a maleimide-containing precursor A and a Lewis-base-containing precursor B. The prepolymer (a) may be one or more prepolymers having the repeated structure -ABABAB- or -($A_2$)B($A_2$)B($A_2$)-. Afterwards, reacting with the basic promoter C, hyper-branched polymer(s) P with higher molecular weight, longer chain, and having the multiple-branched structure and the repeated structure -ABABABCABABAB- or -($A_2$)B($A_2$)B($A_2$)C($A_2$)B($A_2$)B($A_2$)- is obtained.

For the gel (jellified state) electrolyte following the synthesis scheme (1), the electrolyte solution is preferably a nonaqueous metal salt electrolyte solution and the nonaqueous metal salt electrolyte solution has an ion conductivity of 3~13 mS/cm. The metal salts may be $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)$, $LiCF_3SO_3$ or the mixtures thereof. The solvent may be ethylene carbonate (EC), propylene carbonate (PC), butylene carbonate, dipropyl carbonate, acid anhydrides, N-methyl pyrrolidone, N-methyl formamide, dimethylformamide, gamma-butyrolactone, acetonitrile, dimethyl sulfoxide, dimethyl sulphite, 1,2-dimethoxyethane (DME), 1,2-dibutoxyethane, tetrahydrofuran, 2-methyl tetrahydrofuran, epoxypropane, methyl acetate, methyl butyrate, ethyl butyrate, methyl propionate, ethyl propionate, dimethyl carbonate, diethyl carbonate (DEC), methyl ethyl carbonate or any of the mixtures thereof.

Herein, the hyper-branched polymers are polymerized in-situ and impregnated with the nonaqueous electrolyte solution to form a gel type electrolyte (gel electrolyte), with a solid content preferably of 0.1 wt %~20 wt %, relative to the total weight of the gel electrolyte.

In addition, the gel polymer electrolyte disclosed herein may be used to fabricate the polymer lithium-ion secondary battery, which at least includes a casing to define a hollow space to accommodate the gel polymer electrolyte, a positive electrode and a negative electrode.

The materials of the positive electrode may be selected from the element sulfur, organic sulfides, sulfur carbon composite, any of lithium oxides of aluminum, vanadium, titanium, chromium, copper, molybdenum, niobium, iron, nickel, cobalt and manganese, lithium sulfides, lithium selenides, lithium tellurides, lithium phosphides, lithium silicides, lithium aluminum compounds, lithium boride or any of the mixtures thereof.

The materials of the negative electrode may be selected from the metal aluminum, aluminum alloys, mesocarbon microbeads (MCMB), vapor grown carbon fibers (VGCF), carbon nanotubes (CNT), graphene, hard coke, graphite, carbon black, acetylene black, carbon fibers, glassy carbon, lithium titanium oxide, silicon, silicon base alloys, tin, tin-base alloys or any of the mixtures thereof.

The gel electrolyte is formed by impregnating the afore-mentioned hyper-branched polymer P with the electrolyte solution and the afore-mentioned hyper-branched polymer P is formed by offering a prepolymer (a) through an addition reaction of a maleimide-containing precursor A and a Lewis-base-containing precursor B and after filling the prepolymer (a) into the space within the battery casing and reacting with the basic promoter C. Namely, the afore-mentioned hyper-branched polymer P is polymerized in-situ (in the battery cavity) and no coating process is required, which simplifies the process steps and lowers the production costs.

In addition, the afore-mentioned hyper-branched polymer obtained following synthesis scheme (2) may modify (i.e. cover) the surface of the electrode active material containing within the material of the positive or negative electrode, and the resultant composite material can assist ion infiltration, which alleviates electrode concentration polarization and avoids battery degradation upon large current discharging. The afore-mentioned polymer may covers onto the surface of the electrode active material in a ratio of 1~20 wt %, with a coverage thickness of 1 nm~1 micron.

The nonaqueous solvent may be selected from tetrahydrofuran (THF), dimethylacetamide (DMAc), N-methyl-2-pyrrolidone (NMP), γ-butyrolactone (GBL), propylene carbonate, butylene carbonate, dipropyl carbonate, acid anhydrides, N-methyl formamide, dimethylformamide, acetonitrile, dimethyl sulfoxide, dimethyl sulphite, 1,2-dimethoxyethane, 1,2-dibutoxyethane, tetrahydrofuran 2-methyl tetrahydrofuran, epoxypropane, methyl acetate, methyl butyrate, ethyl butyrate, methyl propionate, ethyl propionate, dimethyl carbonate, diethyl carbonate, methyl ethyl carbonate or any of the mixtures thereof.

The active materials of the positive electrode may be selected from the element sulfur, organic sulfides, sulfur carbon composite, any of lithium oxides of aluminum, vanadium, titanium, chromium, copper, molybdenum, niobium, iron, nickel, cobalt and manganese, lithium sulfides, lithium selenides, lithium tellurides, lithium phosphides, lithium silicides, lithium aluminum compounds, lithium boride or any of the mixtures thereof.

The active materials of the negative electrode may be selected from the metal aluminum, aluminum alloys, mesocarbon microbeads (MCMB), vapor grown carbon fibers (VGCF), carbon nanotubes (CNT), graphene, hard coke, graphite, carbon black, acetylene black, carbon fibers, glassy carbon, lithium titanium oxide, silicon, silicon base alloys, tin, tin-base alloys or any of the mixtures thereof.

EXAMPLE 1

Fabrication of the Gel Polymer Electrolyte

As shown in Table 1, for the samples of No. 1~15, 10 mmol of the maleimide-containing precursors A-1~A4 (as shown below) and 5~60 mmol of the Lewis-base-containing precursors B-1~B-3 (as shown below) are respectively mixed uniformly in the organic electrolyte solution and pre-polymerized overnight. Later, a proper amount of the basic promoter C (such as, 2,4-dimethyl-2-imidazoline) is added and polymerized for at least four hours to obtain the gel electrolyte having a solid content of 5~10 wt %.

In Table 1, for sample of No. 2, 10 mmol of the maleimide-containing precursor A-1 (BMI2300) and 10 mmol of Lewis-base-containing precursor B-1 (Jeffamine® ED-900, Huntsman Ltd.) are mixed uniformly in the organic electrolyte solution <1.1M LiPF6+(EC/PC/DEC in a ratio of 3/2/5 (v/v/v)), so-called electrolyte solution 325>, pre-polymerized overnight. Then, a suitable amount of the basic promoter C (2,4-dimethyl-2-imidazoline, purchased from Alfa Aesar Co., abbreviated as D242) is added to perform polymerization in-situ with a reaction time for at least 6 hours to obtain the gel electrolyte with a solid content of 5 wt %.

In Table 1, for sample of No. 12, 10 mmol of the maleimide-containing precursor A-1 and 5 mmol of the Lewis-base-containing precursor B-1 are mixed in the organic electrolyte solution <1M LiTFSI+DME/dioxolanes (DOL) in a ratio of 2/1 (v/v)), so-called electrolyte solution 21>, and pre-polymerized overnight. Later, a suitable amount of the basic promoter C (2,4-dimethyl-2-imidazoline, D242) is added to perform polymerization in-situ for at least 4 hours, to obtain the gel polymer electrolyte with a solid content of 10 wt %.

The maleimide-containing precursors A-1~A4 and Lewis-base-containing precursors B-1~B-3 are shown as follows.

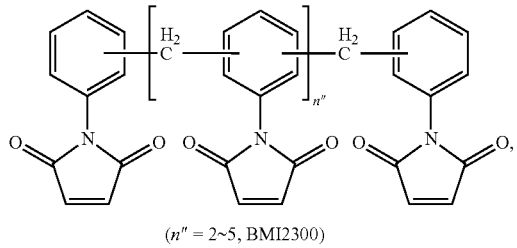

(n″ = 2~5, BMI2300)

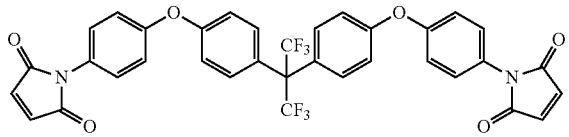

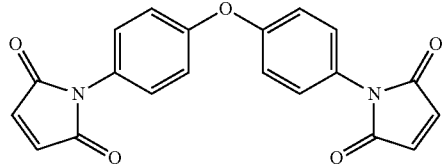

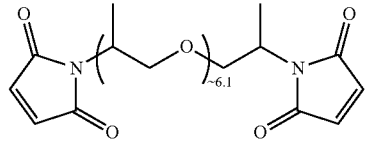

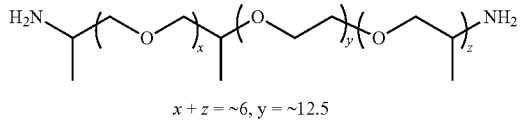

$x + z = \sim 6, y = \sim 12.5$

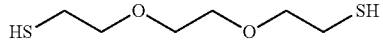

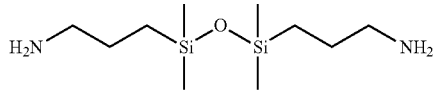

For the formulation, the preferred ratios (molar ratios) of precursor A: precursor B: basic promoter C are in a range of 1:0.1~10:0.01~1, with a solid content range of 0.1 wt %~20 wt %. Table 1 shows embodiments of the disclosure, but is not used to limit the claimed scope of the disclosure.

Ion conductivity (σ) of the electrolyte is obtained from alternating-current impedance analysis under the alternating-current and scanning from 600 kHz to 0.1 Hz, taking the intercepted actual impedance (Z') when virtual impedance (Z″) equivalent to zero using the Nyquist frequency spectrum and calculated using the following formula:

$$\sigma = L/(AR)$$

L=distance between two electrodes, R=impedance of electrolyte, A=electrode area.

TABLE 1

The composition of the gel polymer electrolyte (GPE) in different ratios and the ion conductivity at room temperature thereof.

| No. | A (mmol) | B (mmol) | electrolyte solution (wt %) | σ (mS/cm) |
|---|---|---|---|---|
| 1 | — | — | 325(100) | 8.9 |
| 2 | A-1(10) | B-1 (10) | 325(95) | 8.5 |
| 3 | A-1(10) | B-1 (10) | 325(90) | 8.6 |
| 4 | A-1(10) | B-1 (10) | 325(85) | 5.4 |
| 5 | A-1(10) | B-1 (10) | 325(80) | 5.8 |
| 6 | A-1(10) | B-1 (5) | 325(95) | 8.4 |
| 7 | A-1(10) | B-1 (5) | 325(90) | 6.4 |
| 8 | A-1(10) | B-1 (5) | 325(85) | 3.5 |
| 9 | A-1(10) | B-1 (5) | 325(80) | 0.7 |
| 10 | — | — | 21(100) | 14.1 |
| 11 | A-1(10) | B-1 (5) | 21(95) | 13.3 |
| 12 | A-1(10) | B-1 (5) | 21(90) | 13.2 |
| 13 | A-2(10) | B-1 (20) | 325(85) | 3.7 |
| 14 | A-3(10) | B-2(40) | 325(90) | 5.3 |
| 15 | A-4(10) | B-3(60) | 325(80) | 1.6 |

For example, the sulfur carbon composite material in a S/C ratio of 3/7 is used as the electrode material and used in combination with the electrolyte solution, 5 wt % of the gel polymer electrolyte (No. 11 in Table 1) <together with electrolyte solution 325> and 10 wt % of the gel polymer electrolyte (No. 12 in Table 1) <together with electrolyte solution 21> to fabricate the coin cells for charging and discharging tests, and the results thereof are shown in FIG. 1. The results indicate that 5 wt % of GPE can effectively alleviate the diffusion of polysulfides and avoid the rapid degradation of battery capacity.

EXAMPLE 2

Fabrication of Composite Electrode 10 g of $LiCoO_2$ (the active material of positive electrode) and the maleimide-containing precursor A-1 (2 mmol) are placed in the flask and 10 g of N-methyl pyrrolidinone (NMP) is added and mixed. Then, the Lewis-base-containing precursor B-1 (1 mmol) is added and stirred overnight. Later, a small amount of the basic promoter C (D242) is added and reacted overnight. The next day, separates the solution and solid with the centrifuge, decant the liquid and centrifugate again with acetone. The process is repeated several times and oven-dried to obtain the surface modified $LiCoO_2$. The thermogravimetric analysis results reveal 1.6 wt % of the hyper-branched polymer modified onto $LiCoO_2$, the results are also identified by scanning electron microscopy and transmission electron microscopy to confirm that the hyper-branched polymer modified and covered the surface of the $LiCoO_2$ (with a coverage thickness of about 10~40 nm). In fact, the polymer of the disclosure can modify and cover the surface of the active material of electrode to form a composite material for assisting ion infiltration.

Figure 2:
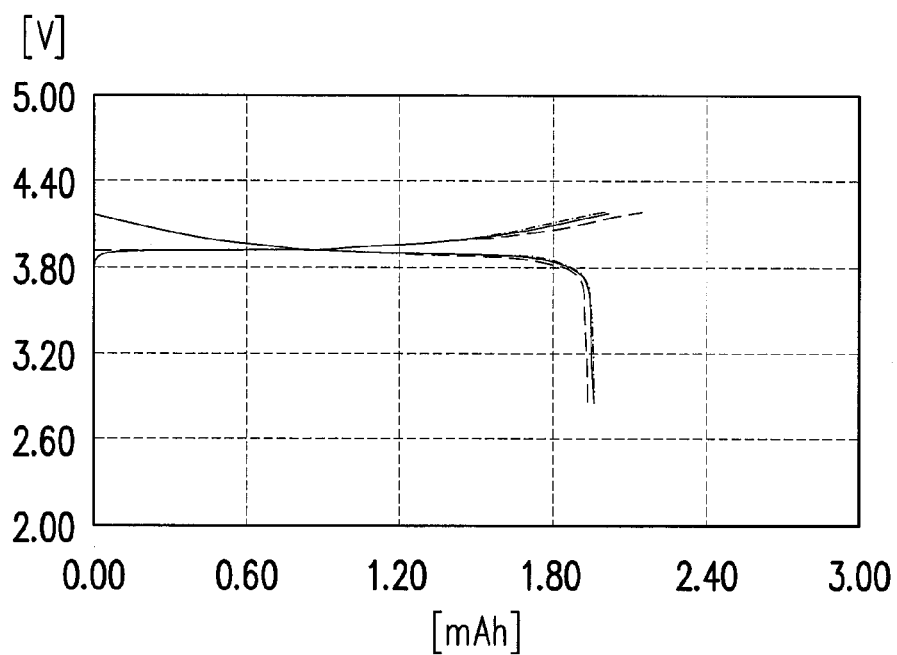
FIG. 2 illustrates the charging and discharging curves of the coin cells having the composite electrodes fabricated with polymer modified electrode active materials according to embodiments of the disclosure.

The obtained composite material is mixed with NMP to prepare the paste in a ratio of $LiCoO_2$ (based on its content within the composite material), PVdF-HFP and the conductive carbon of 91.3:5:3.7. The paste of the positive electrode is coated to an aluminum foil, dried and pressed to obtain a positive electrode of a thickness of 60 μm. Such electrode is assembled with the electrolyte solution 325 and lithium metal to fabricate a coin cell (type: CR2032), having a capacity of 1.9 mAh. The charging and discharging curves of the coin cell is shown in FIG. 2, which is comparable to the commercial coin cells.

EXAMPLE 3

The Gel Polymer Electrolyte with the Composite Electrode

Figure 3:
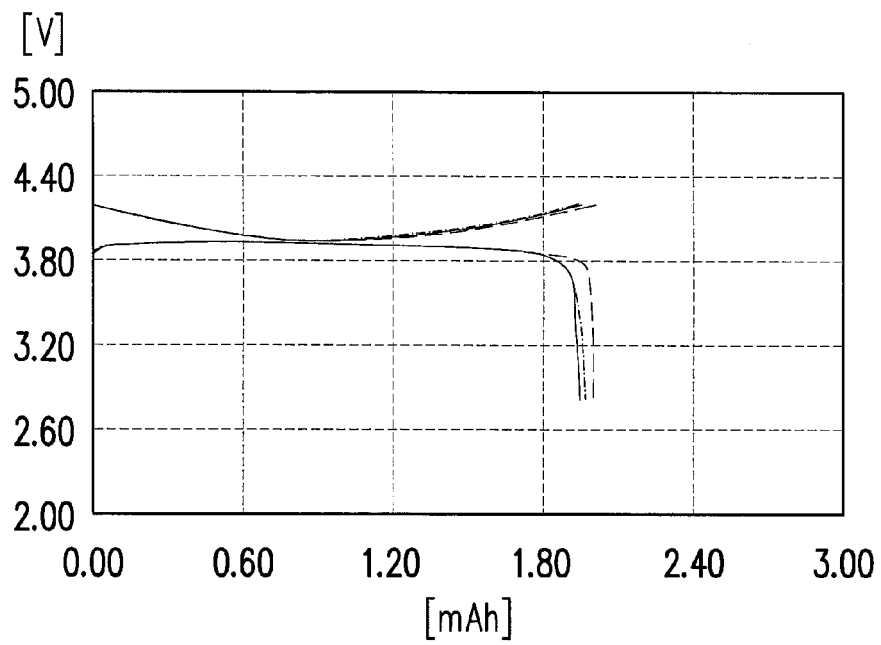
FIG. 3-4 illustrate the charging and discharging curves of the coin cells having the composite electrodes fabricated with polymer modified electrode active materials and polymerized gel electrolytes according to embodiments of the disclosure.
Figure 4:
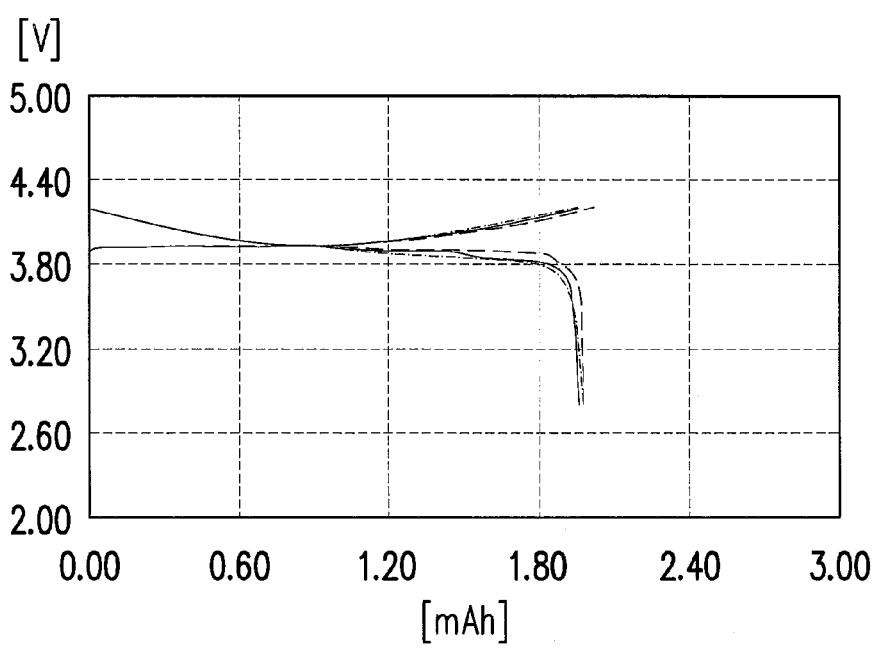

The maleimide-containing precursor A-1 (BMI2300), Lewis-base-containing precursor B-1 (Jeffamine® ED-900), basic promoter C (D242) and electrolyte solution 325 are added in specific ratios (as shown in Table 2) to prepare the gel polymer electrolyte compositions of samples No. 16 and No. 17. Together with the composite electrodes of the polymer modified electrode active material in Example 2, these samples as the electrolyte solution, 2 wt % or 8 wt % of the gel polymer electrolyte (GPE) are used to fabricate the half cells. The charging and discharging curves of the half cells using samples of No. 16 and No. 17 are shown in FIG. 3-4, which is comparable to the commercial coin cells.

Figure 5:
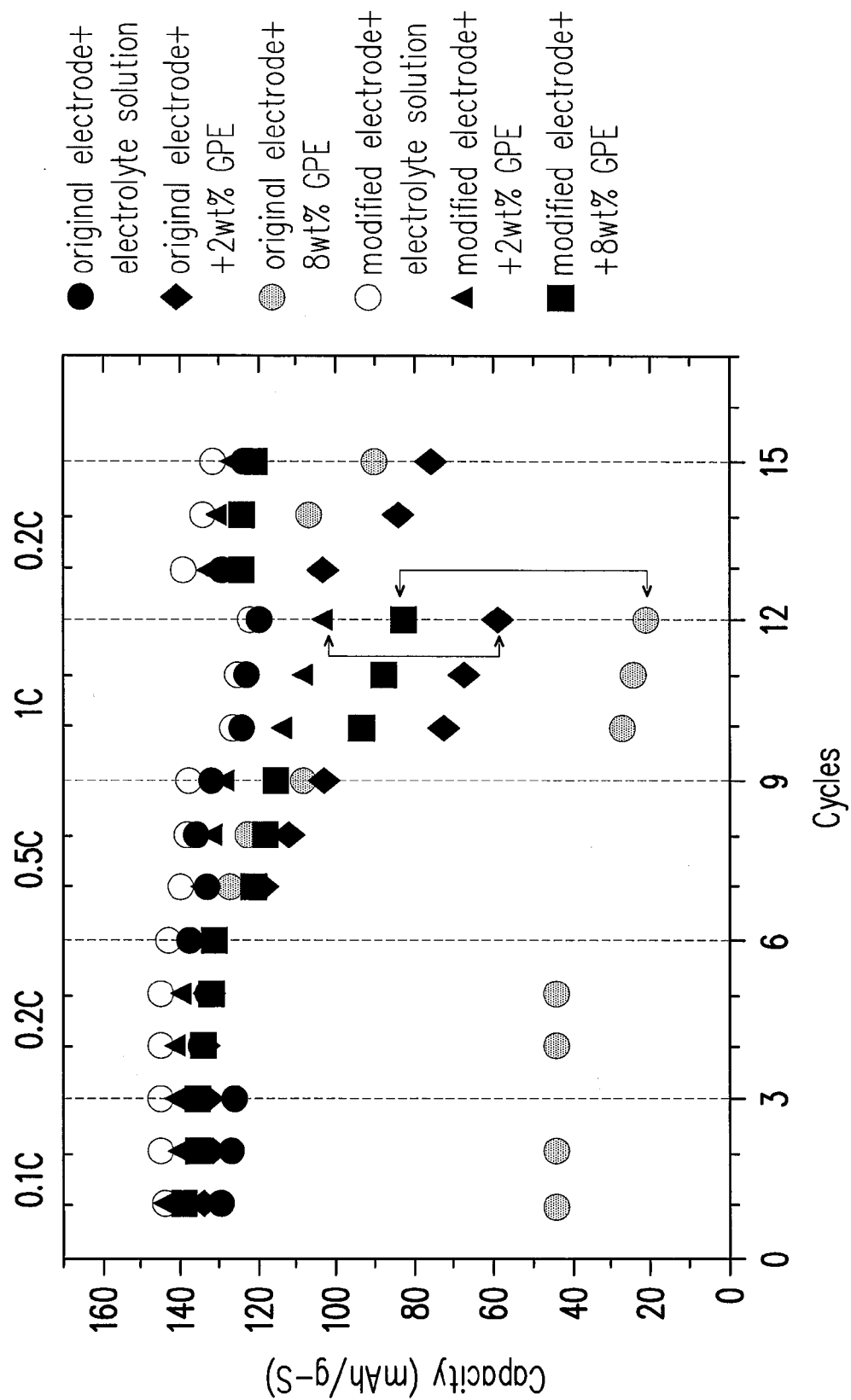
FIG. 5 illustrates the charging and discharging results of the coin cells according to embodiments of the disclosure.

The charging and discharging results of the half cells using the original electrode and the composite electrode composed of the polymer modified electrode active material (modified electrode) together with the gel electrolyte at 0.5C and 1C for comparison. In FIG. 5, the capacities of the batteries with the original electrode or the modified electrode and used in combination with the gel polymer electrolyte (GPE) of various ratios, after several charging and discharging cycles are compared, and the results indicate that rapid degradation of the battery capacity under large current discharging can be prevented.

TABLE 2

| No. | BMI2300 | ED900 | 325 (wt %) |
|---|---|---|---|
| 16 | 2 mmol | 1.3 mmol | 98 |
| 17 | 2 mmol | 1.3 mmol | 92 |

EXAMPLE 4

The Gel Polymer Electrolyte with Electrodes of Different Thicknesses

Figure 6:
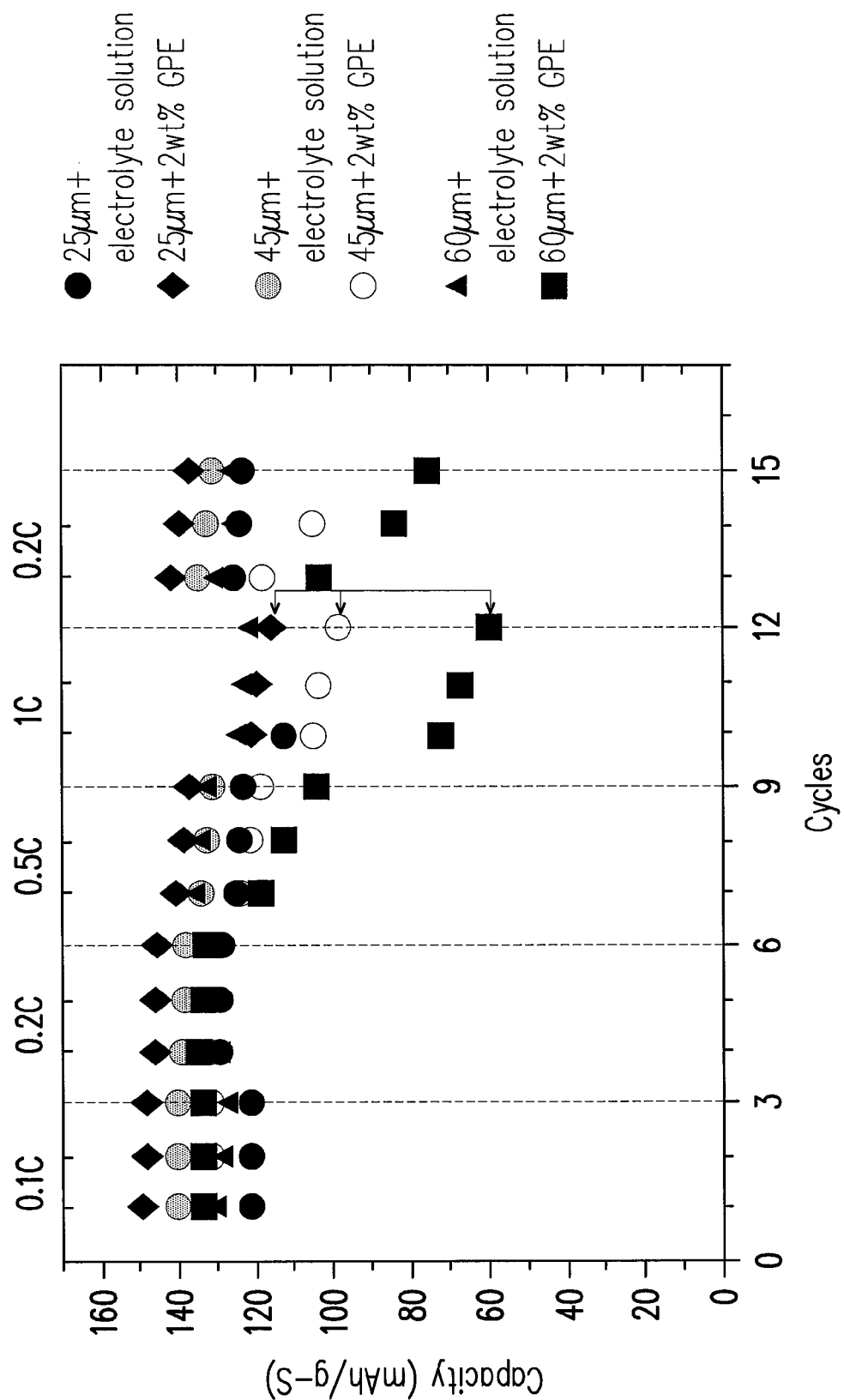
FIG. 6 illustrates the charging and discharging results of the coin cells according to embodiments of the disclosure.

The electrode active material $LiCoO_2$, PVdF-HFP and the conductive carbon are mixed in a ratio of 91.3:5:3.7 with NMP to prepare the paste of the positive electrode. The paste of the positive electrode is coated to an aluminum foil, dried and pressed to obtain a positive electrode of a thickness of 25 μm, 45 μm and 60 μm. The maleimide-containing precursor A-1 (BMI2300), Lewis-base-containing precursor B-1 (Jeffamine® ED-900), basic promoter C (D242) and electrolyte solution 325 are added in specific ratios (referring to Table 3) to prepare the gel polymer electrolyte compositions of samples No. 18 and No. 19. Together with the composite electrodes of the polymer modified electrode active material in Example 2, these samples as the electrolyte solution, or 2 wt % of the gel polymer electrolyte (GPE) are used to fabricate the half cell. The charging and discharging results of the batteries are shown in FIG. 6. From the obtained results, for the battery using the electrode of the thickness of 25 μm, 2 wt % of the gel polymer electrolyte (GPE), the charging and discharging results at 0.5C and 1C are best.

TABLE 3

| No. | BMI2300 | ED900 | 325 (wt %) |
|-----|---------|-------|------------|
| 18  | 0       | 0     | 100        |
| 19  | 2 mmol  | 1.3 mmol | 98      |

The gel polymer electrolyte(s) of this disclosure is obtained by forming hyper-branched polymers that are impregnated with the common electrolyte solution to form the gel electrolyte, and may function as the electrolyte for the batteries. The hyper-branched polymers of the gel polymer electrolyte(s) of this disclosure have a wide range of molecular weight and are capable of absorbing the electrolytes in large quantities. The gel polymer electrolyte of this disclosure has a high conductivity and is safe to use.

Through polymerization in-situ, the gel polymer electrolyte(s) of this disclosure is compatible with the vacuum filling process of the batteries, which avoids the bottleneck coating process for spreading the gel electrolyte. Also, due to the high viscosity of the gel polymer electrolyte, the active material loss during the charging and discharging process of the lithium sulfur batteries may be alleviated. The gel polymer electrolyte or the hyper-branched polymers of this disclosure may modify and cover the surface of the electrode active material of the positive or negative electrode to form the composite material(s), which may alleviate the concentration polarization and lessen the degradation under large current discharging.

This disclosure has been described above in several embodiments, but is not limited to those. It is known to persons skilled in the art that some modifications and innovations may be made without departing from the spirit and scope of this disclosure. Hence, the scope of this disclosure should be defined by the following claims.

What is claimed is:

1. A gel polymer electrolyte, having a polymer impregnated with a nonaqueous electrolyte solution to form the gel polymer electrolyte, wherein the polymer is represented by the following general formula (I):

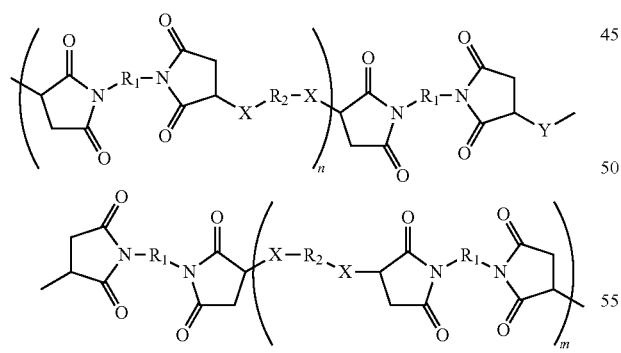

(I)

wherein n≥1, m≥1 and n+m=2~500; X is independently selected from NH, N, S, or P; Y is nitrogen-containing five-membered heterocyclic group or nitrogen-containing six-membered heterocyclic group; $R_1$ is independently selected from —$CH_2NHCH_2$—, —$C_2H_4NHC_2H_4$—, —$C(O)CH_2$—, —$CH_2OCH_2$—, —$C(O)$—, —$O$—, —$O$—$O$—, —$S$—, —$S$—$S$—, —$S(O)$—, —$CH_2S(O)CH_2$—, —$(O)S(O)$—, —$CH_2(C_6H_4)CH_2$—, —$CH_2(C_6H_4)O$—, —$(CH_2CH(CH_3)O)_a$— where a=1~70, —$(CH_2CH_2O)_b$— where b=1~100, —$O(C_6H_4)C(CF_3)_2(C_6H_4)O$—, substituted or non-substituted phenylene, substituted or non-substituted biphenylene, or —$(CH_2CH_2)_d$— where d=1~4, or any of the following groups:

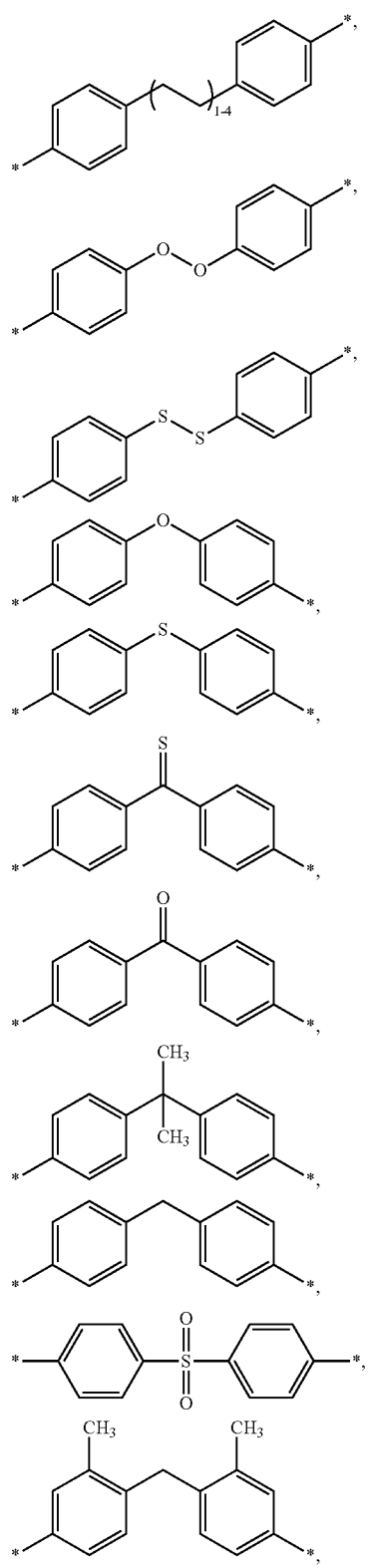

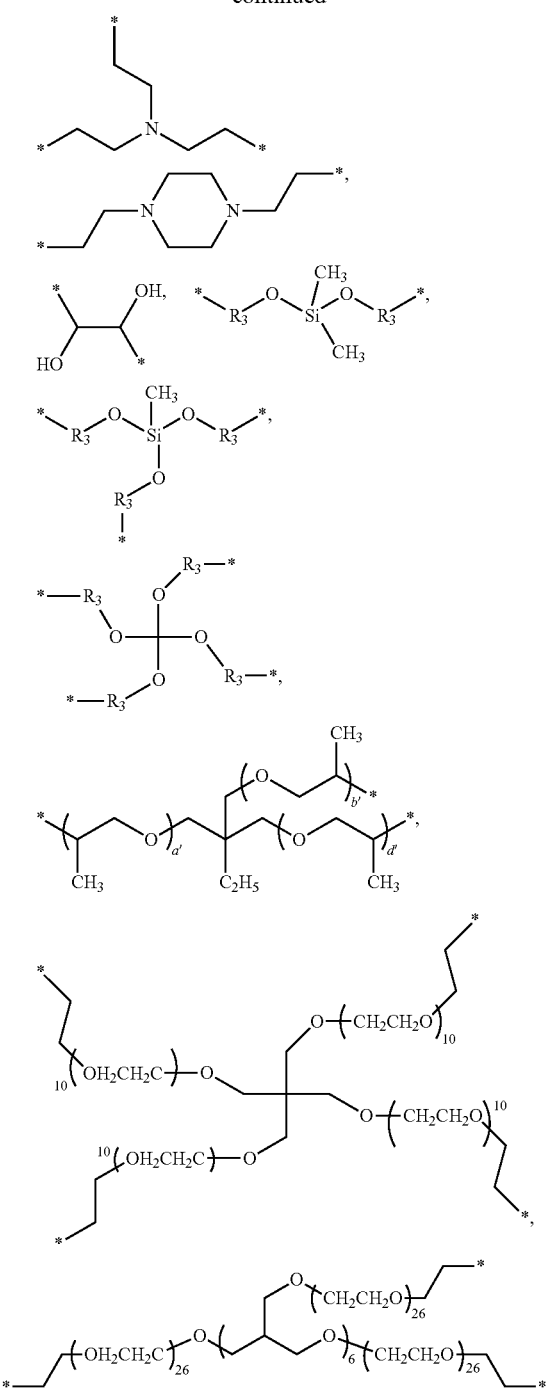

$R_3$ is —$(CH_2CH_2O)$—, phenylene or alkylene, and (a'+b'+d') is 5~6; and $R_2$ is selected from any of the following groups:

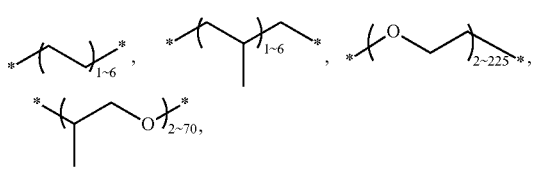

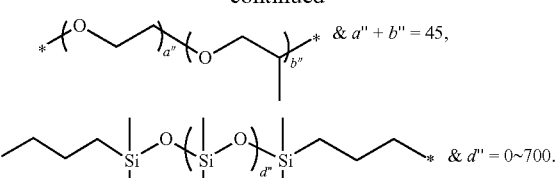

2. The gel polymer electrolyte of claim 1, wherein the nonaqueous electrolyte solution is a nonaqueous metal salt electrolyte solution and the nonaqueous metal salt electrolyte solution has an ion conductivity of 3~13 mS/cm.

3. The gel polymer electrolyte of claim 2, wherein a metal salt of the nonaqueous metal salt electrolyte solution is selected from $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)$, $LiCF_3SO_3$ or the mixtures thereof.

4. The gel polymer electrolyte of claim 2, wherein a solvent of the nonaqueous metal salt electrolyte solution is selected from ethylene carbonate, propylene carbonate, butylene carbonate, dipropyl carbonate, acid anhydrides, N-methyl pyrrolidone, N-methyl formamide, dimethylformamide, gamma-butyrolactone, acetonitrile, dimethyl sulfoxide, dimethyl sulphite, 1,2-dimethoxyethane, 1,2-dibutoxyethane, tetrahydrofuran, 2-methyl tetrahydrofuran, epoxypropane, methyl acetate, methyl butyrate, ethyl butyrate, methyl propionate, ethyl propionate, dimethyl carbonate, diethyl carbonate, methyl ethyl carbonate or any of the mixtures thereof.

5. The gel polymer electrolyte of claim 1, wherein the polymer is formed by forming a prepolymer (a) through an addition reaction of a maleimide-containing precursor A and a Lewis-base-containing precursor B in the nonaqueous electrolyte solution, and adding an amount of a basic promoter C to promote a polymerization reaction and cross-linking.

6. The gel polymer electrolyte of claim 5, wherein the maleimide-containing precursor A is a compound represented by the following formulae (1)-(4):

formula (1)

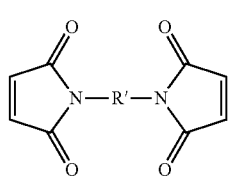

(1)

R' is independently selected from —$CH_2NHCH_2$—, —$C_2H_4NHC_2H_4$—, —$C(O)CH_2$—, —$CH_2OCH_2$—, —C(O)—, —O—, —O—O—, —S—, —S—S—, —S(O)—, —$CH_2S(O)CH_2$—, —(O)S(O)—, —$CH_2(C_6H_4)CH_2$—, —$CH_2(C_6H_4)O$—, —$(CH_2CH(CH_3)O)_a$— where a=1~70, —$(CH_2CH_2O)_b$— where b=1~100, —$O(C_6H_4)C(CF_3)_2(C_6H_4)O$—, substituted or non-substituted phenylene, substituted or non-substituted biphenylene, or —$(CH_2CH_2)_d$— where d=1~4, or any of the following functional groups:

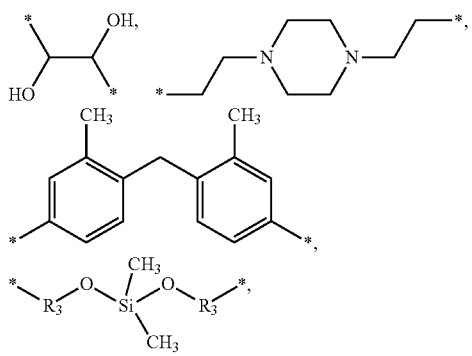

$R_3$ may be —$(CH_2CH_2O)$—, phenylene or alkylene;

formula (2)

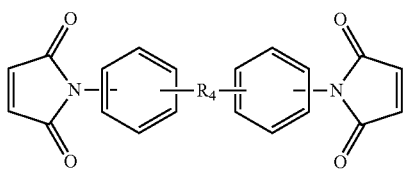
(2)

$R_4$ is —$(CH_2CH_2)n'$—, —$C(O)$—, —$C(CH_3)_2$—, —$O$—, —$O$—$O$—, —$S$—, —$S$—$S$—, —$S(O)$—, —$(O)S(O)$—, or —$O(C_6H_4)C(CF_3)_2(C_6H_4)O$—, and $n'=1\sim4$;

formula (3)

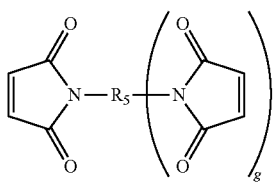
(3)

$g=2$, 3 or 7, and when $g=2$, $R_5$ is independently selected from the following functional groups:

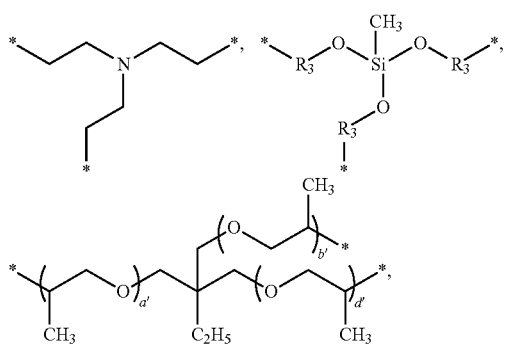

$R_3$ may be —$(CH_2CH_2O)$—, phenylene or alkylene, and $(a'+b'+d')$ may be $5\sim6$;

when $g=3$, $R_5$ is selected from any of the following functional groups:

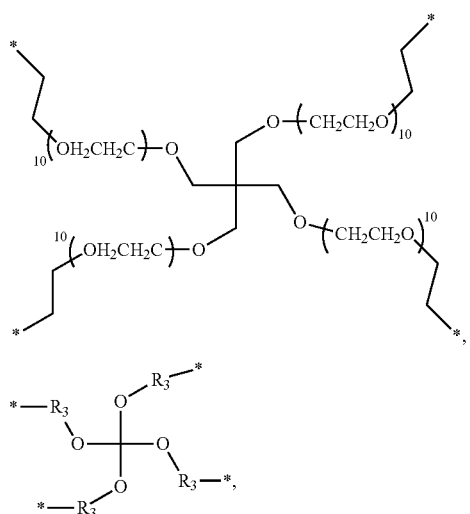

$R_3$ may be —$(CH_2CH_2O)$—, phenylene or alkylene;

when $g=7$, $R_5$ is represented by the following functional group:

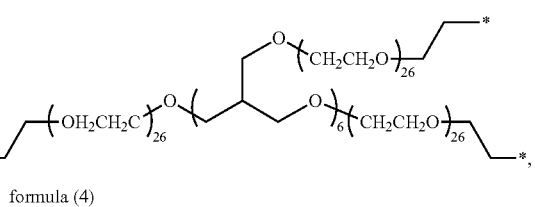

formula (4)

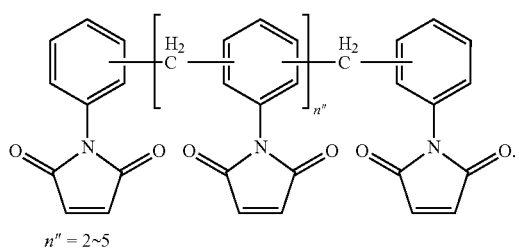
(4)

$n'' = 2\sim5$

7. The gel polymer electrolyte of claim 5, wherein the Lewis-base-containing precursor B is a compound represented by the following formula (5), (5') or (5"):

formula (5), (5') & (5")

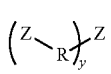
(5)

(5')

(5")

$y=1\sim3$, $y'=1\sim3$, $y''=1\sim2$, $Z=NH_2$ or $SH$, and $R$ is selected from any of the following functional groups:

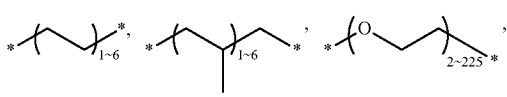

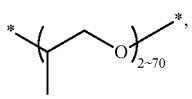

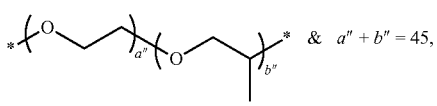

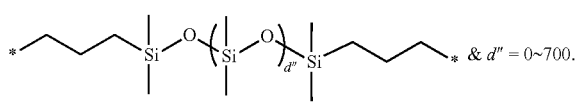

8. The gel polymer electrolyte of claim 5, wherein the basic promoter C is a compound represented by the following formulae (6)-(13):

formula (6)

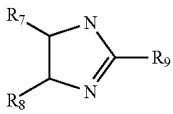
(6)

formula (7)

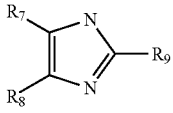
(7)

formula (8)

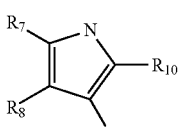
(8)

formula (9)

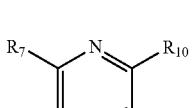
(9)

formula (10)

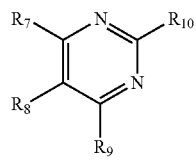
(10)

formula (11)

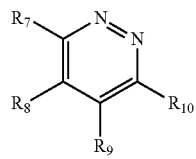
(11)

formula (12)

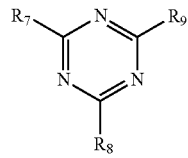
(12)

$R_7$, $R_8$, $R_9$, $R_{10}$ are individually selected from hydrogen, alkyl, alkylene, phenyl, dimethylamino, halogen or —NH$_2$;

formula (13)

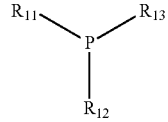
(13)

$R_{11}$, $R_{12}$, $R_{13}$ are individually selected from alkyl, alkylene, substituted or non-substituted phenyl or halogen.

9. The gel polymer electrolyte of claim 5, wherein molar ratios of the maleimide-containing precursor A: the Lewis-base-containing precursor B: the basic promoter C are ranged as 1:1~10:0.01~1, and a solid content of the gel polymer electrolyte ranges from 0.1 wt % to 20 wt %.

10. A polymer lithium-ion secondary battery, comprising at least a gel polymer electrolyte, a positive electrode and a negative electrode, wherein the gel polymer electrolyte is formed with a polymer impregnated within a nonaqueous electrolyte solution, and the polymer is represented by the following general formula (I):

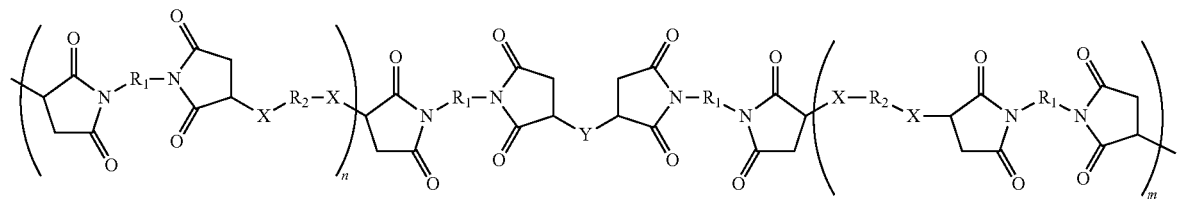

(I)

wherein n≥1, m≥1 and n+m=2~500; X is independently selected from NH, N, S, or P; Y is nitrogen-containing five-membered heterocyclic group or nitrogen-containing six-membered heterocyclic group; $R_1$ is independently selected from —CH$_2$NHCH$_2$—, —C$_2$H$_4$NHC$_2$H$_4$—, —C(O)CH$_2$—, —CH$_2$OCH$_2$—, —C(O)—, —O—, —O—O—, —S—, —S—S—, —S(O)—, —CH$_2$S(O)CH$_2$—, —(O)S(O)—, —CH$_2$(C$_6$H$_4$)CH$_2$—, —CH$_2$(C$_6$H$_4$)O—, —(CH$_2$CH(CH$_3$)O)$_a$— where a=1~70, —(CH$_2$CH$_2$O)$_b$— where b=1~100, —O(C$_6$H$_4$)C(CF$_3$)$_2$(C$_6$H$_4$)O—, substituted or non-substituted phenylene, substituted or non-substituted biphenylene, or —(CH$_2$CH$_2$)$_d$— where d=1~4, or any of the following groups:

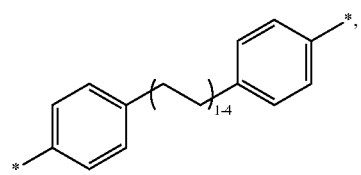

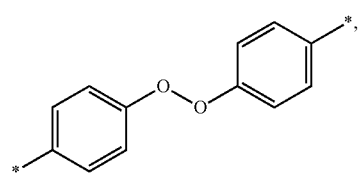

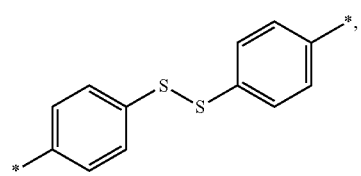

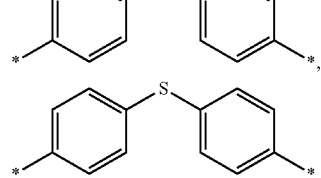

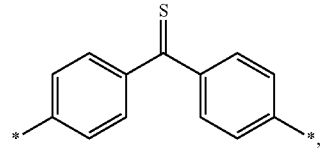

-continued

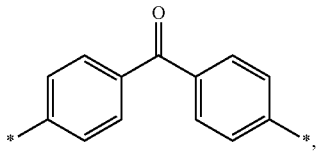

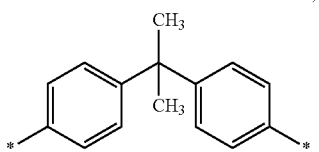

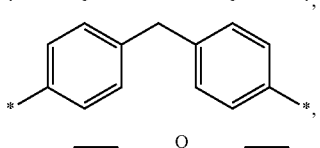

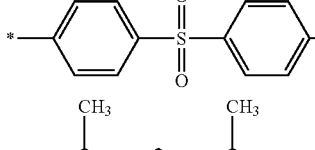

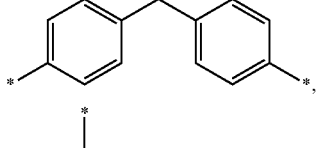

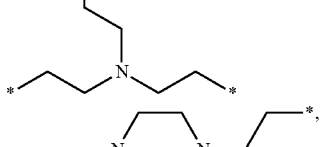

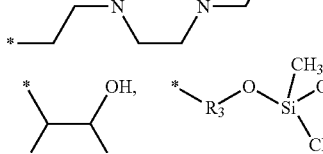

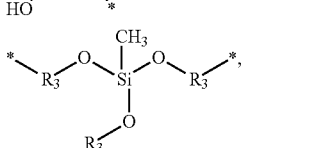

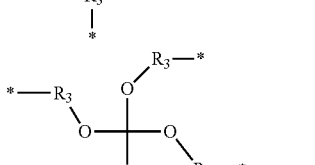

-continued

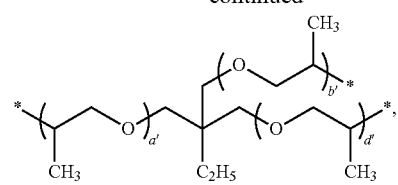

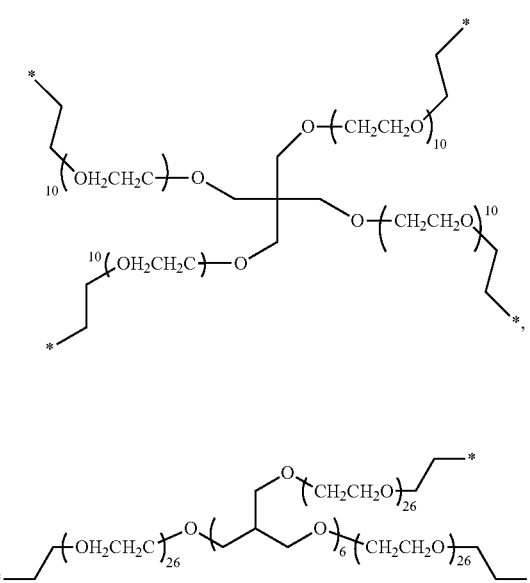

$R_3$ is —$(CH_2CH_2O)$—, phenylene or alkylene, and (a'+b'+d') is 5~6; and $R_2$ is selected from any of the following groups:

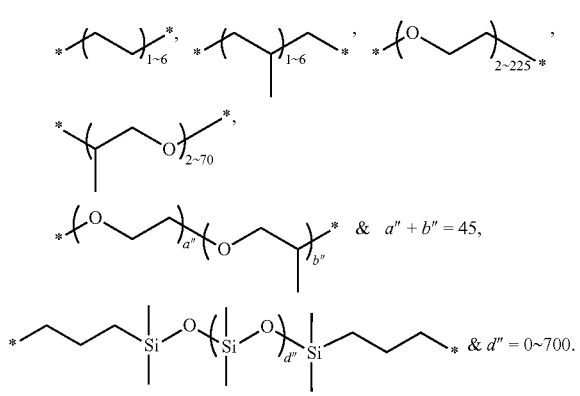

11. The polymer lithium-ion secondary battery of claim 10, wherein the polymer is formed by framing a prepolymer through an addition reaction of a maleimide-containing precursor A and a Lewis-base-containing precursor B in the nonaqueous electrolyte solution, and adding an amount of a basic promoter C to promote a polymerization reaction and cross-linking.

12. The polymer lithium-ion secondary battery of claim 11, wherein the maleimide-containing precursor A is a compound represented by the following formulae (1)-(4):

formula (1)

R' is independently selected from —$CH_2NHCH_2$—, —$C_2H_4NHC_2H_4$—, —$C(O)CH_2$—, —$CH_2OCH_2$—, —$C(O)$—, —O—, —O—O—, —S—, —S—S—, —$S(O)$—, —$CH_2S(O)CH_2$—, —$(O)S(O)$—, —$CH_2(C_6H_4)CH_2$—, —$CH_2(C_6H_4)O$—, —$(CH_2CH(CH_3)O)_a$— where a=1~70, —$(CH_2CH_2O)_b$— where b=1~100, —$O(C_6H_4)C(CF_3)_2(C_6H_4)O$—, substituted or non-substituted phenylene, substituted or non-substituted biphenylene, or —$(CH_2CH_2)_d$— where d=1~4, or any of the following functional groups:

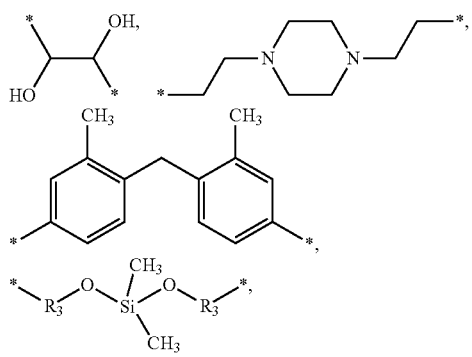

$R_3$ may be —$(CH_2CH_2O)$—, phenylene or alkylene;

formula (2)

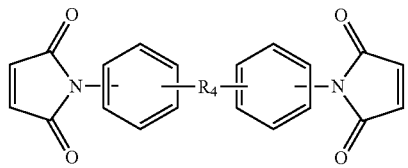

$R_4$ is —$(CH_2CH_2)n'$—, —$C(O)$—, —$C(CH_3)_2$—, —O—, —O—O—, —S—, —S—S—, —$S(O)$—, —$(O)S(O)$—, or —$O(C_6H_4)C(CF_3)_2(C_6H_4)O$—, and n'1~4;

formula (3)

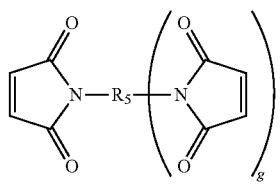

g=2, 3 or 7, and when g=2, $R_5$ is independently selected from the following functional groups:

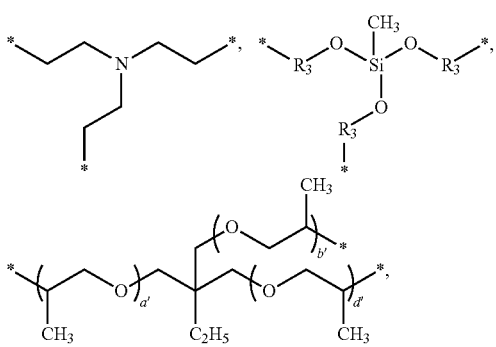

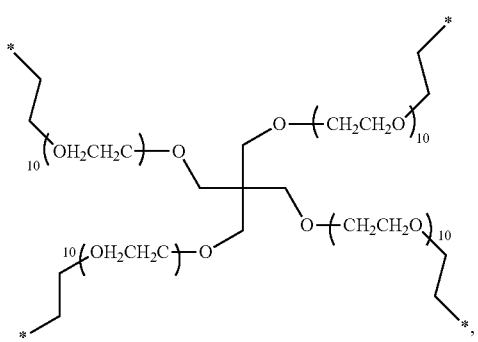

$R_3$ may be —$(CH_2CH_2O)$—, phenylene or alkylene, and $(a'+b'+d')$ may be 5~6;

when $g=3$, $R_5$ is selected from any of the following functional groups:

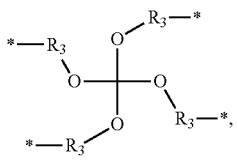

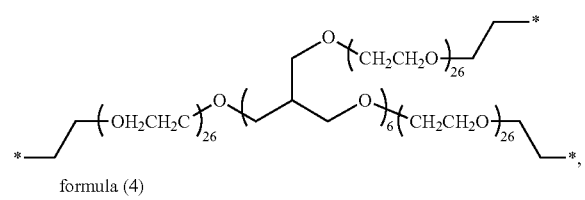

$R_3$ may be —$(CH_2CH_2O)$—, phenylene or alkylene;
when $g=7$, $R_5$ is represented by the following functional group:

formula (4)

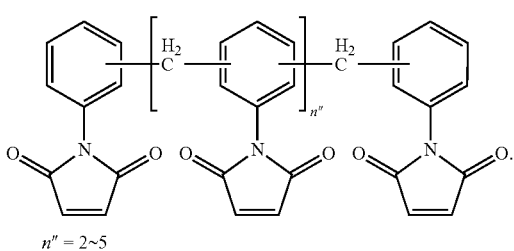

(4)

$n'' = 2~5$

13. The polymer lithium-ion secondary battery of claim 11, the Lewis-base-containing precursor B is a compound represented by the following formula (5), (5') or (5''):

formula (5), (5') & (5'')

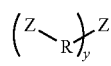

(5)

$(ZR)_{y'}$—$CH_{(3-y')}$—RZ  (5')

$(ZR)_{y''}$—$NH_{(2-y'')}$—RZ  (5'')

$y=1~3$, $y'=1~3$, $y''=1~2$, $Z=NH_2$ or SH, and R is selected from any of the following functional groups:

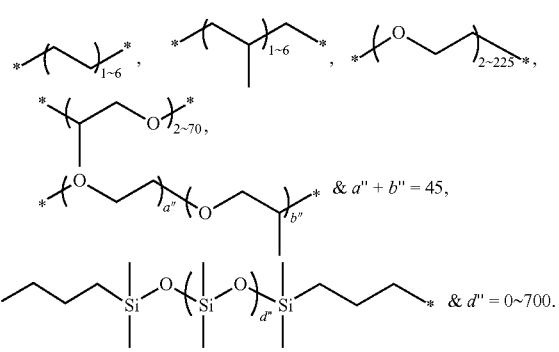

14. The polymer lithium-ion secondary battery of claim 11, wherein the basic promoter C is a compound represented by the following formulae (6)-(13):

formula (6)

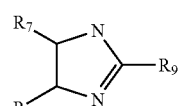
(6)

formula (7)

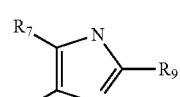
(7)

formula (8)

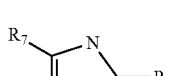
(8)

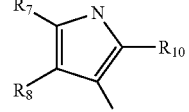

formula (9)

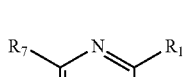
(9)

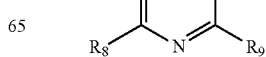

formula (10)

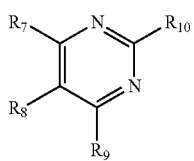

formula (11)

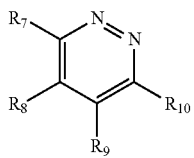

formula (12)

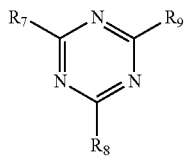

$R_7$, $R_8$, $R_9$, $R_{10}$ are individually selected from hydrogen, alkyl, alkylene, phenyl, dimethylamino, halogen or —$NH_2$;

formula (13)

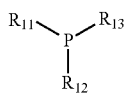

$R_{11}$, $R_{12}$, $R_{13}$ are individually selected from alkyl, alkylene, substituted or non-substituted phenyl or halogen.

15. The polymer lithium-ion secondary battery of claim 11, wherein molar ratios of the maleimide-containing precursor A: the Lewis-base-containing precursor B: the basic promoter C are ranged as 1:0.1~10:0.01~1, and a solid content of the gel polymer electrolyte ranges from 0.1 wt % to 20 wt %.

16. The polymer lithium-ion secondary battery of claim 10, wherein an active material of the positive electrode is selected from the element sulfur, organic sulfides, sulfur carbon composite, any of lithium oxides of aluminum, vanadium, titanium, chromium, copper, molybdenum, niobium, iron, nickel, cobalt and manganese, lithium sulfides, lithium selenides, lithium tellurides, lithium phosphides, lithium silicides, lithium aluminum compounds, lithium boride or any of the mixtures thereof.

17. The polymer lithium-ion secondary battery of claim 16, wherein a surface of the active material of the positive electrode is covered and modified by the gel polymer electrolyte to form a composite electrode and a coverage thickness of the gel polymer electrolyte ranges from 1 nanometer to 1 micron.

18. The polymer lithium-ion secondary battery of claim 16, wherein a surface of the active material of the positive electrode is modified and covered by the polymer to form a composite electrode and a coverage thickness of the polymer ranges from 1 nanometer to 1 micron.

19. The polymer lithium-ion secondary battery of claim 10, wherein an active material of the negative electrode is selected from the metal aluminum, aluminum alloys, mesocarbon microbeads (MCMB), vapor grown carbon fibers (VGCF), carbon nanotubes (CNT), graphene, hard coke, graphite, carbon black, acetylene black, carbon fibers, glassy carbon, lithium titanium oxide, silicon, silicon base alloys, tin, tin-base alloys or any of the mixtures thereof.

20. The polymer lithium-ion secondary battery of claim 19, wherein a surface of the active material of the negative electrode is covered and modified by the gel polymer electrolyte to form a composite electrode and a coverage thickness of the gel polymer electrolyte ranges from 1 nanometer to 1micron.

21. The polymer lithium-ion secondary battery of claim 19, wherein a surface of the active material of the negative electrode is modified and covered by the polymer to form a composite electrode and a coverage thickness of the polymer ranges from 1 nanometer to 1 micron.

22. The polymer lithium-ion secondary battery of claim 10, wherein the nonaqueous electrolyte solution is a nonaqueous metal salt electrolyte solution and the nonaqueous metal salt electrolyte solution has an ion conductivity of 3~13 mS/cm.

23. The polymer lithium-ion secondary battery of claim 22, wherein a metal salt of the nonaqueous metal salt electrolyte solution is selected from $LiPF_6$, $LiBF_4$, $LiASF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)$, $LiCF_3SO_3$ or the mixtures thereof.

24. The polymer lithium-ion secondary battery of claim 22, wherein a solvent of the nonaqueous metal salt electrolyte solution is selected from ethylene carbonate, propylene carbonate, butylene carbonate, dipropyl carbonate, acid anhydrides, N-methyl pyrrolidone, N-methyl formamide, dimethylformamide, gamma-butyrolactone, acetonitrile, dimethyl sulfoxide, dimethyl sulphite, 1,2-dimethoxyethane, 1,2-dibutoxyethane, tetrahydrofuran, 2-methyl tetrahydrofuran, epoxypropane, methyl acetate, methyl butyrate, ethyl butyrate, methyl propionate, ethyl propionate, dimethyl carbonate, diethyl carbonate, methyl ethyl carbonate or any of the mixtures thereof.

25. A polymer lithium-ion secondary battery, comprising at least a gel polymer electrolyte, an positive electrode and a negative electrode, wherein at least one of both materials of the positive electrode and negative electrode includes an active material of electrode modified by a polymer layer thereon, the polymer modifies and covers a surface of the electrode active material in a ratio of 1~20 wt %, and the polymer is represented by the following general formula (I):

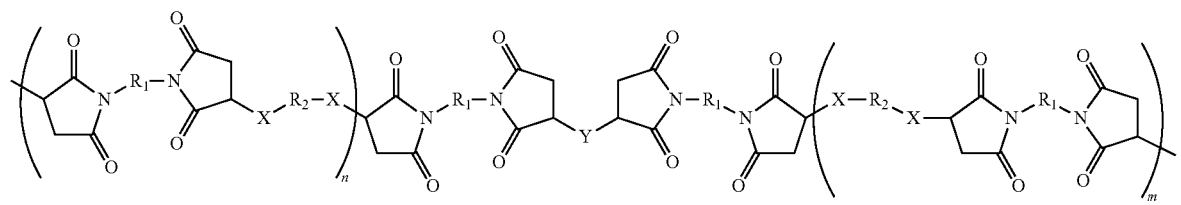

(I)

wherein n≥1, m≥1 and n+m=2~500; X is independently selected from NH, N, S, or P; Y is nitrogen-containing five-membered heterocyclic group or nitrogen-containing six-membered heterocyclic group; $R_1$ is independently selected from —$CH_2NHCH_2$—, —$C_2H_4NHC_2H_4$—, —C(O)$CH_2$—, —$CH_2OCH_2$—, —C(O)—, —O—, —O—O—, —S—, —S—S—, —S(O)—, —$CH_2S(O)CH_2$—, —(O)S(O)—, —$CH_2(C_6H_4)CH_2$—, —$CH_2(C_6H_4)O$—, —($CH_2CH(CH_3)O)_a$— where a=1~70, —($CH_2CH_2O)_b$— where b=1~100, —O($C_6H_4$)C($CF_3$)$_2$($C_6H_4$)O—, substituted or non-substituted phenylene, substituted or non-substituted biphenylene, or —($CH_2CH_2)_d$— where d=1~4, or any of the following groups:

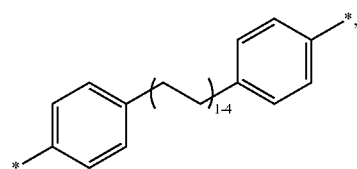

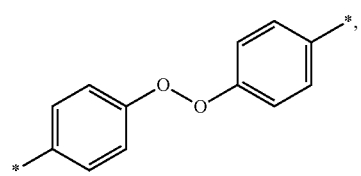

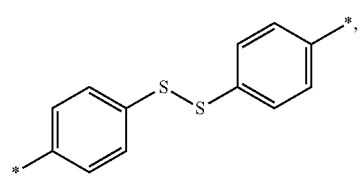

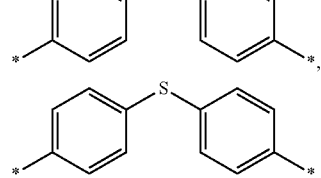

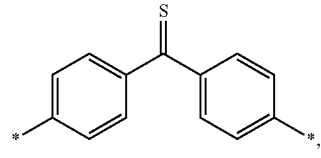

-continued

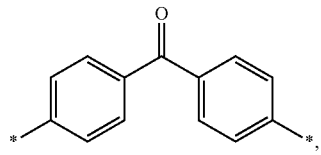

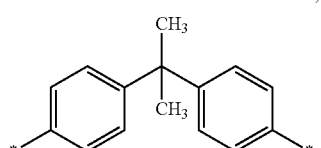

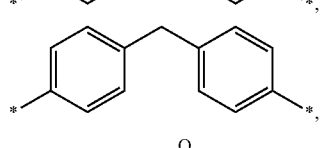

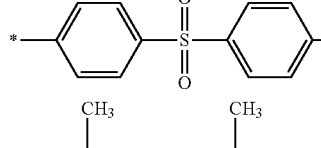

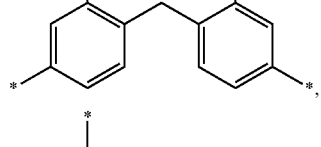

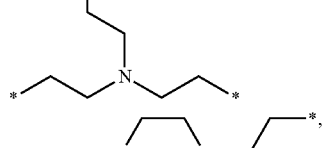

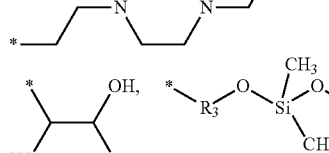

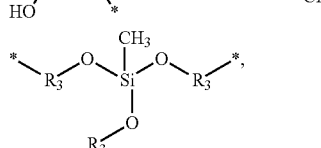

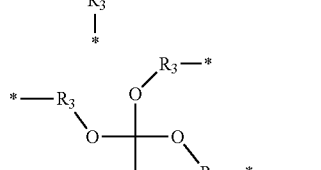

-continued

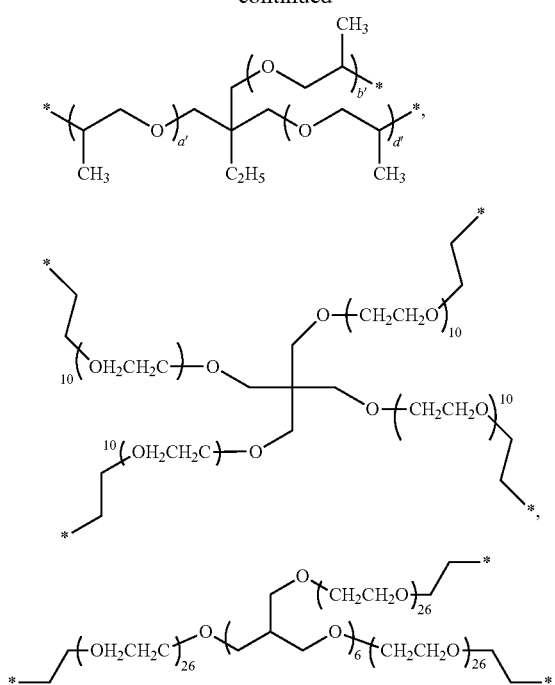

$R_3$ is —$(CH_2CH_2O)$—, phenylene or alkylene, and (a'+b'+d') is 5~6; and $R_2$ is selected from any of the following groups:

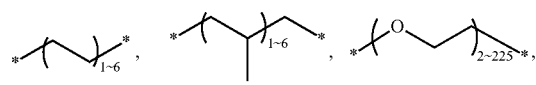

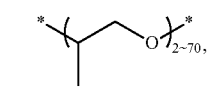

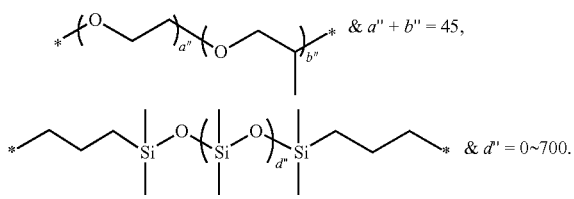

26. The polymer lithium-ion secondary battery of claim 25, wherein the polymer is formed by forming a prepolymer through an addition reaction of a maleimide-containing precursor A and a Lewis-base-containing precursor B in the nonaqueous solvent, and adding an amount of a basic promoter C to promote a polymerization reaction and cross-linking.

27. The polymer lithium-ion secondary battery of claim 26, wherein the maleimide-containing precursor A is a compound represented by the following formulae (1)-(4):

formula (1)

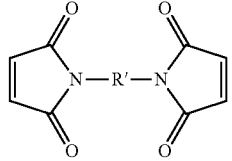

(1)

R' is independently selected from —$CH_2NHCH_2$—, —$C_2H_4NHC_2H_4$—, —$C(O)CH_2$—, —$CH_2OCH_2$—, —$C(O)$—, —O—, —O—O—, —S—, —S—S—, —S(O)—, —$CH_2S(O)CH_2$—, —(O)S(O)—, —$CH_2(C_6H_4)CH_2$—, —$CH_2(C_6H_4)O$—, —$(CH_2CH(CH_3)O)_a$— where a=1~70, —$(CH_2CH_2O)_b$— where b=1~100, —$O(C_6H_4)C(CF_3)_2(C_6H_4)O$—, substituted or non-substituted phenylene, substituted or non-substituted biphenylene, or —$(CH_2CH_2)_d$— where d=1~4, or any of the following functional groups:

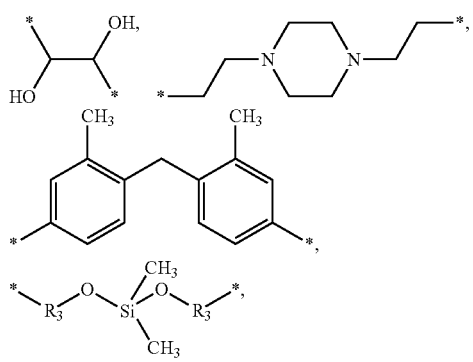

$R_3$ may be —$(CH_2CH_2O)$—, phenylene or alkylene;

formula (2)

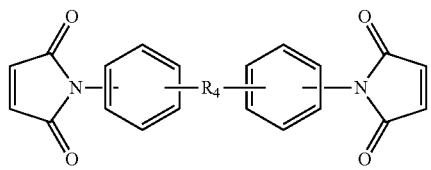

(2)

$R_4$ is —$(CH_2CH_2)n'$—, —$C(O)$—, —$C(CH_3)_2$—, —O—, —O—O—, —S—, —S—S—, —S(O)—, —(O)S(O)—, or —$O(C_6H_4)C(CF_3)_2(C_6H_4)O$—, and n'=1~4;

formula (3)

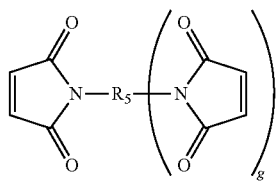

(3)

g=2, 3 or 7, and when g=2, $R_5$ is independently selected from the following functional groups:

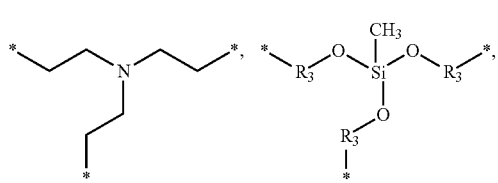

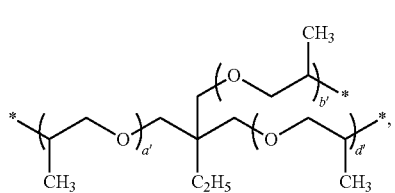

$R_3$ may be —$(CH_2CH_2O)$—, phenylene or alkylene, and (a'+b'+d') may be 5~6;

when g=3, $R_5$ is selected from any of the following functional groups:

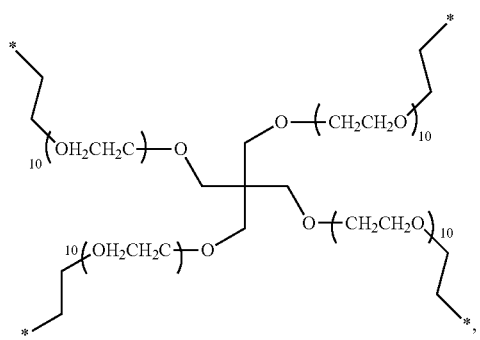

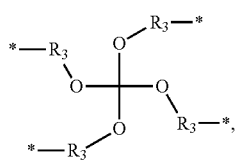

$R_3$ may be —$(CH_2CH_2O)$—, phenylene or alkylene;

when g=7, $R_5$ is represented by the following functional group:

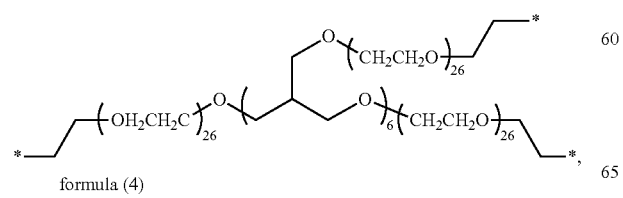

formula (4)

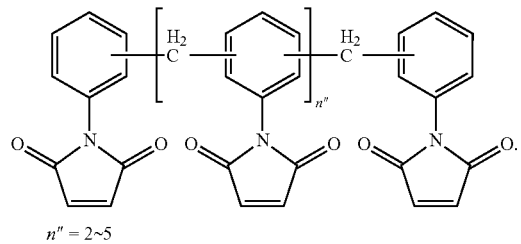

$n'' = 2~5$

28. The polymer lithium-ion secondary battery of claim 26, the Lewis-base-containing precursor B is a compound represented by the following formula (5), (5') or (5"):

formula (5), (5') & (5")

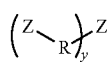 (5)

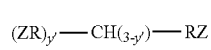 (5')

 (5")

y=1~3, y'=1~3, y"=1~2, Z=$NH_2$ or SH, and R is selected from any of the following functional groups:

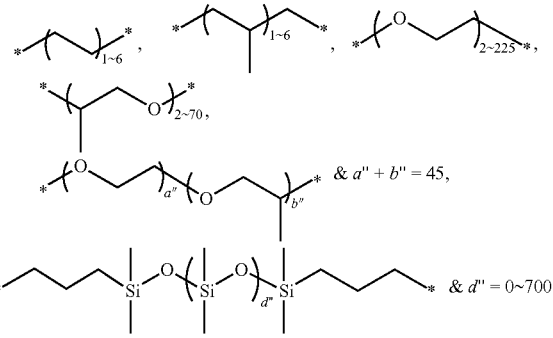

29. The polymer lithium-ion secondary battery of claim 26, wherein the basic promoter C is a compound represented by the following formulae (6)-(13):

formula (6)

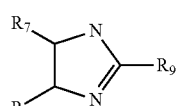 (6)

formula (7)

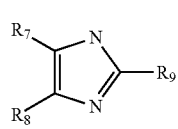 (7)

-continued formula (8)

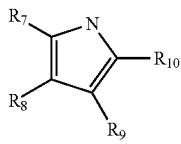

formula (9)

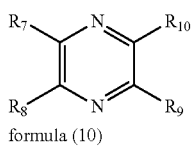

formula (10)

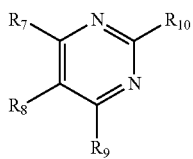

formula (11)

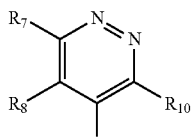

formula (12)

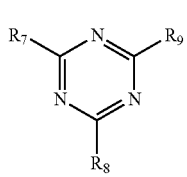

$R_7$, $R_8$, $R_9$, $R_{10}$ are individually selected from hydrogen, alkyl, alkylene, phenyl, dimethylamino, halogen or —$NH_2$;

formula (13)

$R_{11}$, $R_{12}$, $R_{13}$ are individually selected from alkyl, alkylene, substituted or non-substituted phenyl or halogen.

30. The polymer lithium-ion secondary battery of claim 26, wherein molar ratios of the maleimide-containing precursor A: the Lewis-base-containing precursor B: the basic promoter C are ranged as 1:0.1~10:0.01~1, and a solid content of the gel polymer electrolyte ranges from 0.1 wt % to 20 wt %.

31. The polymer lithium-ion secondary battery of claim 25, wherein the nonaqueous solvent is selected from tetrahydrofuran, dimethylacetamide, N-methyl-2-pyrrolidone, γ-butyrolactone, propylene carbonate, butylene carbonate, dipropyl carbonate, acid anhydrides, N-methyl formamide, dimethylformamide, acetonitrile, dimethyl sulfoxide, dimethyl sulphite, 1,2-dimethoxyethane, 1,2-dibutoxyethane, tetrahydrofuran 2-methyl tetrahydrofuran, epoxypropane, methyl acetate, methyl butyrate, ethyl butyrate, methyl propionate, ethyl propionate, dimethyl carbonate, diethyl carbonate, methyl ethyl carbonate or any of the mixtures thereof.

32. The polymer lithium-ion secondary battery of claim 25, wherein an active material of the positive electrode is selected from the element sulfur, organic sulfides, sulfur carbon composite, any of lithium oxides of aluminum, vanadium, titanium, chromium, copper, molybdenum, niobium, iron, nickel, cobalt and manganese, lithium sulfides, lithium selenides, lithium tellurides, lithium phosphides, lithium silicides, lithium aluminum compounds, lithium boride or any of the mixtures thereof.

33. The polymer lithium-ion secondary battery of claim 25, wherein an active material of the negative electrode is selected from the metal aluminum, aluminum alloys, mesocarbon microbeads (MCMB), vapor grown carbon fibers (VGCF), carbon nanotubes (CNT), graphene, hard coke, graphite, carbon black, acetylene black, carbon fibers, glassy carbon, lithium titanium oxide, silicon, silicon base alloys, tin, tin-base alloys or any of the mixtures thereof.

* * * * *